(12) United States Patent
Williams et al.

(10) Patent No.: US 9,051,442 B2
(45) Date of Patent: Jun. 9, 2015

(54) POLYURETHANE FOAM PREMIXES CONTAINING HALOGENATED OLEFIN BLOWING AGENTS AND FOAMS MADE FROM SAME

(75) Inventors: David J. Williams, East Amherst, NY (US); Mary C. Bogdan, Buffalo, NY (US); Clifford P. Gittere, Amherst, NY (US); Andrew J. Poss, Kenmore, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 98 days.

(21) Appl. No.: 13/400,559

(22) Filed: Feb. 20, 2012

(65) Prior Publication Data

US 2012/0220677 A1 Aug. 30, 2012

Related U.S. Application Data

(60) Provisional application No. 61/445,027, filed on Feb. 21, 2011, provisional application No. 61/494,868, filed on Jun. 8, 2011, provisional application No. 61/445,022, filed on Feb. 21, 2011.

(51) Int. Cl.

| | | |
|---|---|---|
| *C08G 18/22* | (2006.01) | |
| *C08J 9/14* | (2006.01) | |
| *C08G 18/09* | (2006.01) | |
| *C08G 18/18* | (2006.01) | |
| *C08G 18/40* | (2006.01) | |
| *C08G 18/42* | (2006.01) | |
| *C08G 18/50* | (2006.01) | |
| *C08G 18/54* | (2006.01) | |
| *C08J 9/00* | (2006.01) | |
| *C08G 101/00* | (2006.01) | |

(52) U.S. Cl.
CPC .............. *C08J 9/146* (2013.01); *C08G 18/092* (2013.10); *C08G 18/1816* (2013.01); *C08G 18/222* (2013.01); *C08G 18/225* (2013.01); *C08G 18/227* (2013.01); *C08G 18/4018* (2013.01); *C08G 18/4027* (2013.01); *C08G 18/4208* (2013.01); *C08G 18/5021* (2013.01); *C08G 18/546* (2013.01); *C08G 2101/0016* (2013.01); *C08G 2101/0025* (2013.01); *C08G 2105/02* (2013.01); *C08J 9/0028* (2013.01); *C08J 2203/162* (2013.01); *C08J 2375/04* (2013.01)

(58) Field of Classification Search
USPC ......... 521/123, 124, 125, 126, 127, 128, 129, 521/130, 131, 170; 252/182.24, 182.29
See application file for complete search history.

(56) References Cited

U.S. PATENT DOCUMENTS

| | | | |
|---|---|---|---|
| 2,834,748 A | 5/1958 | Bailey et al. | |
| 2,846,458 A | 8/1958 | Haluska | |
| 2,917,480 A | 12/1959 | Bailey et al. | |
| 3,001,973 A | 9/1961 | Piepenbrink et al. | |
| 3,124,605 A | 3/1964 | Wagner | |
| 3,201,372 A | 8/1965 | Wagner | |
| 3,277,138 A | 10/1966 | Holtschmidt et al. | |
| 3,394,164 A | 7/1968 | McClellan et al. | |
| 3,401,190 A | 9/1968 | Schmitt et al. | |
| 3,454,606 A | 7/1969 | Brotherton et al. | |
| 3,492,330 A | 1/1970 | Trecker et al. | |
| 4,147,847 A | 4/1979 | Schweiger | |
| 4,868,224 A | 9/1989 | Harasin et al. | |
| 6,403,847 B1 | 6/2002 | Nakada et al. | |
| 6,844,475 B1 | 1/2005 | Tung et al. | |
| 7,189,884 B2 | 3/2007 | Mukhopadhyay et al. | |
| 7,230,146 B2 | 6/2007 | Merkel et al. | |
| 7,485,729 B2 | 2/2009 | Hsieh et al. | |
| 2008/0255262 A1* | 10/2008 | De Vos et al. ................. | 521/155 |
| 2009/0099274 A1* | 4/2009 | Van Der Puy et al. ........ | 521/110 |
| 2010/0280141 A1* | 11/2010 | Loh et al. ...................... | 521/155 |

OTHER PUBLICATIONS

"The Scientific Assessment of Ozone Depletion, 2002," a report of the World Meteorological Association's Global Ozone Research and Monitoring Project (CH) (too voluminous).
Saunders and Frisch, "Polyurethanes Chemistry and Technology," vols. I and II, 1962, Ed., John Wiley and Sons, New York, N.Y. (US) (too voluminous).
Gum, Reese, Ulrich, "Reaction Polymers," 1992, Oxford University Press, New York, N.Y (US) (too voluminous).
Klempner and Sendijarevic, "Polymeric Foams and Foam Technology," 2004, Hanser Gardner Publications, Cincinnati, OH (US) (too voluminous).
King Industries, Inc., "High Performance Products for Coatings, Inks, Adhesives and Sealants," (Brochure) King Industries Specialty Chemicals, copyright 2006, Norwalk, CT (US).
King Industries, Inc., "Preliminary Data Sheet—K-KAT and XC-C227," Product Data Sheet, Issued Nov. 6, 2003, p. 1-3, King Industries Specialty Chemicals, Norwalk, CT (US).

* cited by examiner

*Primary Examiner* — John Cooney
(74) *Attorney, Agent, or Firm* — Colleen D. Szuch

(57) ABSTRACT

The invention provides polyurethane and polyisocyanurate foams and methods for the preparation thereof. More particularly, the invention relates to closed-celled, polyurethane and polyisocyanurate foams and methods for their preparation. The foams are characterized by a fine uniform cell structure and little or no foam collapse. The foams are produced with a polyol premix composition which comprises a combination of a hydrohaloolefin blowing agent, a polyol, a silicone surfactant, and a non-amine catalyst used alone or in combination with an amine catalyst.

28 Claims, 5 Drawing Sheets

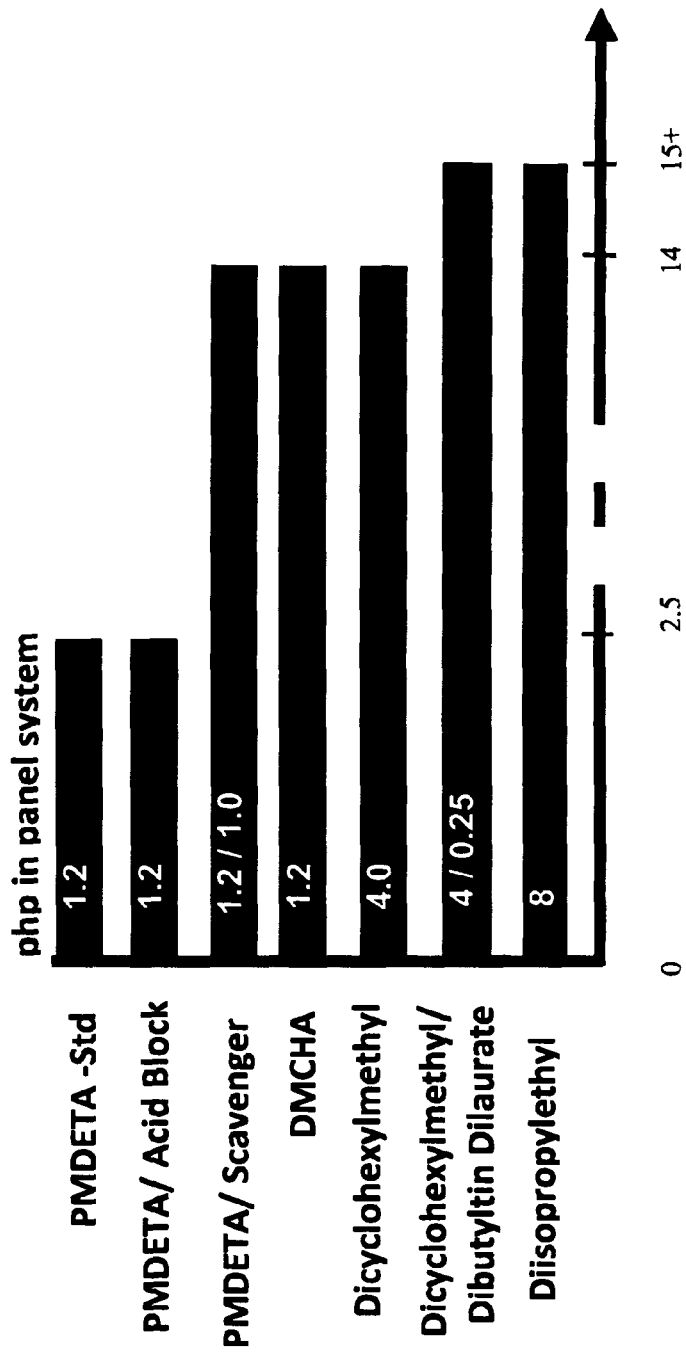

POLYURETHANE FOAM PREMIXES CONTAINING HALOGENATED OLEFIN BLOWING AGENTS AND FOAMS MADE FROM SAME

CROSS REFERENCE TO RELATED APPLICATIONS

The present invention relates to and claims the priority benefit of each of U.S. Application 61/494,868, filed May 14, 2012, U.S. Application 61/445,027, filed Feb. 21, 2011 and U.S. Application 61/445,022, filed Feb. 21, 2011, each of which is incorporated herein by reference in its entirety as if fully set forth below.

Also incorporated herein by reference is concurrently filed application bearing U.S. application Ser. No. 13/400,563, filed Feb. 20, 2012.

FIELD OF THE INVENTION

The present invention pertains to polyurethane and polyisocyanurate foams, to blowing agents and catalyst systems and methods for the preparation thereof.

BACKGROUND OF THE INVENTION

Low density, rigid to semi-rigid polyurethane or polyisocyanurate foams have utility in a wide variety of insulation applications including roofing systems, building panels, building envelope insulation, spray applied foams, one and two component froth foams, insulation for refrigerators and freezers, and so called integral skin for applications such as steering wheels and other automotive or aerospace cabin parts, shoe soles, and amusement park restraints. Important to the large-scale commercial acceptance of rigid polyurethane foams is their ability to provide a good balance of properties. For example, many rigid polyurethane and polyisocyanurate foams are known to provide outstanding thermal insulation, excellent fire resistance properties, and superior structural properties at reasonably low densities. Integral skin foams are generally known to produce a tough durable outer skin and a cellular, cushioning core.

It is known in the art to produce rigid or semi-rigid polyurethane and polyisocyanurate foams by reacting a polyisocyanate with one or more polyols in the presence of one or more blowing agents, one or more catalysts, one or more surfactants and optionally other ingredients. Blowing agents that have heretofor been used include certain compounds within the general category of compounds including hydrocarbons, fluorocarbons, chlorocarbons, chlorofluorocarbons, hydrochlorofluorocarbons, halogenated hydrocarbons, ethers, esters, aldehydes, alcohols, ketones, and organic acid or gas, most often $CO_2$, generating materials. Heat is generated when the polyisocyanate reacts with the polyol. This heat volatilizes the blowing agent contained in the liquid mixture, thereby forming bubbles therein. In the case of gas generating materials, gaseous species are generated by thermal decomposition or reaction with one or more of the ingredients used to produce the polyurethane or polyisocyanurate foam. As the polymerization reaction proceeds, the liquid mixture becomes a cellular solid, entrapping the blowing agent in the foam's cells. If a surfactant is not used in the foaming composition, in many cases the bubbles simply pass through the liquid mixture without forming a foam or forming a foam with large, irregular cells rendering it not useful.

The foam industry has historically used liquid blowing agents that include certain fluorocarbons because of their ease of use and ability to produce foams with superior mechanical and thermal insulation properties. These certain fluorocarbons not only act as blowing agents by virtue of their volatility, but also are encapsulated or entrained in the closed cell structure of the rigid foam and are the major contributor to the low thermal conductivity properties of the rigid urethane foams. These fluorocarbon-based blowing agents also produce a foam having a favorable k-factor. The k-factor is the rate of transfer of heat energy by conduction through one square foot of one-inch thick homogenous material in one hour where there is a difference of one degree Fahrenheit perpendicularly across the two surfaces of the material. Since the utility of closed-cell polyurethane-type foams is based, in part, on their thermal insulation properties, it would be advantageous to identify materials that produce lower k-factor foams.

Preferred blowing agents also have low global warming potential. Among these are certain hydrohaloolefins including certain hydrofluoroolefins of which trans-1,3,3,3-tetrafluoropropene (1234ze(E)) and 1,1,1,4,4,4hexafluorobut-2-ene (1336mzzm(Z)) are of particular interest and hydrochlorofluoroolefins of which 1-chloro-3,3,3-trifluoropropene (1233zd) (including both cis and trans isomers and combinations thereof) is of particular interest. Processes for the manufacture of trans-1,3,3,3-tetrafluoropropene are disclosed in U.S. Pat. Nos. 7,230,146 and 7,189,884. Processes for the manufacture of trans-1-chloro-3,3,3-trifluoropropene are disclosed in U.S. Pat. Nos. 6,844,475 and 6,403,847.

It is convenient in many applications to provide the components for polyurethane or polyisocyanurate foams in pre-blended formulations. Most typically, the foam formulation is pre-blended into two components. The polyisocyanate and optionally isocyanate compatible raw materials, including but not limited to certain blowing agents and non-reactive surfactants, comprise the first component, commonly referred to as the "A" component. A polyol or mixture of polyols, one or more surfactant, one or more catalyst, one or more blowing agent, and other optional components including but not limited to flame retardants, colorants, compatibilizers, and solubilizers typically comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and other polyols can be added to the mixing head or reaction site. Most conveniently, however, they are all incorporated into one B component.

Applicants have come to appreciate that a shortcoming of two-component systems, especially those using certain hydrohaloolefins, including 1234ze(E), 1336(Z), and 1233zd (E), is the shelf-life of the B-side composition. Normally when a foam is produced by bringing together the A and B side components, a good foam is obtained. However, applicants have found that if the polyol premix composition containing a halogenated olefin blowing agent, including in particular 1234ze(E), 1336(Z), and/or 1233zd(E), and a typical amine-containing catalyst is aged, prior to treatment with the polyisocyanate, deleterious effects can occur. For example, applicants have found that such formulations can produce a foamable composition which has an undesirable increase in reactivity time and/or a subsequent cell coalescence. The resulting foams are of lower quality and/or may even collapse during the formation of the foam.

Applicants have discovered that a dramatic improvement in foam formation and/or performance can be achieved by decreasing the amount of amine-based catalyst in the system, to the point in certain embodiments of substantially eliminating the amine-based catalyst, and using instead certain metal-based catalysts or blends of metal catalyst(s) and amine catalyst(s). While the use of such metal-based catalyst has been found to be especially advantageous in many formulations and applications, applicants have come to appreciate that a difficulty/disadvantage may be present in certain foam pre-mix formulations. More specifically, applicants have found that foam premix formulations having relatively high concentrations of water, as defined hereinafter, tend to not achieve acceptable results in storage stability, in the final foam and/or in the foam processing when certain metal catalysts are utilized. Applicants have found that this unexpected problem can be overcome by careful selection of the metal-based catalyst(s), including complexes and/or blends of metal catalyst(s) and amine catalyst(s) to produce highly advantageous and unexpected results, as described further hereinafter.

SUMMARY

It has now been found that one source of the problem observed by applicants is the undesirable reaction/interaction of certain amine catalysts with certain hydrohaloolefins, particularly during storage of the component and/or during the foaming reaction. Although applicants do not wish to be bound by or to any particular theory, it is believed that such reactions/interactions have both direct and indirect deleterious effects. For example, the decomposition reaction between the amine-based catalyst and the blowing agent depletes the availability of the amine catalyst and/or the blowing agent and hence has a negative effect on reaction times and/or the quality of foam. In addition, the decomposition reaction produces fluorine ions which can have a negative effect on other components in the pre-mixed and/or foamable composition and/or foam, including the surfactant included in such materials.

As a result of extensive testing, applicants have come to appreciate that the negative effects that have been observed can be overcome by a careful and judicious selection of the catalyst system which is used. More specifically, applicants have found that in certain embodiments a substantial advantage can be achieved by the selection of a catalyst system which uses relatively little, and preferably contains no substantial amount of, amine catalyst(s) and a relatively high percentage of, and preferably substantially consists essentially of metallic catalyst (e.g. inorgano-metallic catalysts, organo-metallic catalysts) and/or one or more optional quaternary ammonium carboxylate catalysts.

In addition, while applicants believe that all halogenated olefin blowing agents will exhibit some level of the deleterious effects mentioned above, applicants had surprisingly and unexpectedly found that certain halogenated olefins, particularly monochloro-trifluoropropenes and even more particularly trans-1-chloro-3,3,3-trifluoropropene (1233zd(E)), tend to exhibit only a relatively low level of the deleterious effect, especially when used in combination with catalyst which contains a relatively low level, and preferably no substantial amount of amine-containing catalyst.

Thus, according to one aspect of the invention, applicants have found that blowing agents, foamable compositions, premixes and foams which utilize metal catalysts (and/or the optional carboxylate catalysts), either alone or in combination with a amine catalyst, preferably in minor proportion based on the total weight of the active catalyst, can extend the shelf life of polyol premixes containing hydrohaloolefins and can improve the quality of the foams produced therefrom. This advantage is believed to be present with hydrohaloolefins generally, more preferably but not limited to 1234ze(E), and/or 1233zd(E), and/or 1336mzzm(Z), and even more preferably with 1233zd(E). Applicants have found that good quality foams can be produced according to the present invention even if the polyol blend has been aged several weeks or months.

One aspect of the invention therefore relates to foaming catalysts comprising one or more metal catalysts and optionally amine catalyst, preferably in minor proportion, of a type and in an amount effective to preferably provide little to no loss of reactivity and/or cell structure (i.e., shelf life) over time (preferably at least about two (2) months) when combined with hydrohaloolefin blowing agent, preferably 1234ze (E), 1233zd(E), and/or 1336mzzm(Z), while preferably achieving a reactivity profile similar to a typical amine based catalyst system blowing agents, and to blowing agent compositions, pre-mix compositions, foamable compositions and foams containing or made from the catalyst.

Another aspect of the present invention relates to advantageous selection of metal catalyst for use in connection with high-water content foamable systems and/or foam premix compositions. As the term is used herein, the term high-water content refers to systems and compositions containing greater than about 0.5 parts of water (based on weight) per hundred parts of polyol (hereinafter sometimes referred to as "pphp" or "php") in the system/composition. In preferred embodiments, the high-water content systems contain water in an amount of at least about 0.75, and more preferably at least about 1.0, and even more preferably at least about 1.5 pphp. As will be understood by those skilled in the art, certain formulations are known to have advantage when relatively high levels of water are used and/or are present in the system, particularly in the foam premix component containing the polyol component. While applicants have found that certain zinc-based catalyst generally perform well in systems having HFO and HFCO blowing agents, and particularly in systems which have a blowing agent comprising or consisting essentially of HFCO-1233zd, several of such catalyst exhibit a substantial deterioration in performance when used in high water content systems.

Applicants have discovered a substantial advantage can be achieved in foam properties and/or foaming performance by the use of precipitation-resistant metal-based catalyst(s), and even more preferably precipitation-resistant organometallic catalysts, and even more preferably catalysts selected from organozinc-based catalyst(s), organobismuth-based catalyst(s) and combination of these two. The terms organo-metallic catalysts, organozinc-based catalysts, organobismuth-based catalysts and the like are intended to refer to and are intended to cover in the broad sense both preformed organomettalic complexes and to compositions (including physical combinations, mixtures and/or blends) comprising metal carboxylates, preferably zinc and/or bismuth carboxylates, and amidines. Applicants have found that such metal-based catalyst(s), and particularly combinations of zinc-based catalyst(s) and bismuth-based catalysts, are capable of substantially avoiding precipitation either when present in the polyol formulation maintained at an elevated temperature for a period of time and/or when stored at room temperature for an extended period of time.

As the term is used herein, precipitation-resistant refers to a substantial absence of precipitation by visual observation as a result of the polyol composition, and preferably the polyol premix composition, under at least one, and preferably both, the High Temperature and the Low Temperature test conditions defined herein. A precipitation resistant material satisfies the High Temperature conditions if, after being maintained in a pressure reaction vessel at about 54° C. for 7 days, it does not produce any readily visual precipitate. A precipitation resistant material satisfies the Low Temperature conditions if, after being maintained at about room temperature for a period of at least one month, more preferably about two months and even more preferably a period of about three months, it does not produce any readily visual precipitate. Furthermore, applicants have found that the designation by the manufacturer of a metal-based catalyst as water soluble is not a predictor of the ability of a metal-catalyst, and preferably a zinc-based catalyst or a bismuth-based metal catalyst, to be a precipitation-resistant metal catalyst according to the present invention. Applicants have found that exceptional but unexpected results can be achieved when precipitation-resistant metal catalyst, and preferably precipitation-resistant zinc-based catalyst, bismuth-based metal catalysts and combinations of these, according to the present invention are used in high-water content systems/pre-mix compositions, and even more preferably high-water content systems/pre-mix compositions having at least about 1 pphp water.

Preferred metal catalyst for use as the precipitation resistant metal catalyst of the present invention include zinc-based catalyst (preferably zinc (II)), bismuth-based metal catalyst, and preferably a combination of these, comprising complexes and/or compositions of the metal, preferably in the form of a carboxylate, with substituted amidines. In preferred embodiments, the precipitation resistant catalyst of the present invention comprises: (a) a metal selected from the group consisting of zinc, lithium, sodium, magnesium, barium, potassium, calcium, bismuth, cadmium, aluminum, zirconium, tin, or hafnium, titanium, lanthanum, vanadium, niobium, tantalum, tellurium, molybdenum, tungsten, cesium, preferably zinc and/or bismuth; (b) in a complex and/or composition with a amidine compound; and (c) in a complex and/or composition with an aliphatic, aromatic or polymeric carboxylate, preferably with an equivalent weight of about 45 to about 465.

Although it is contemplated that the metal content (on an elemental basis) of the precipitation-resistant metal catalyst may vary widely, it is preferred in certain embodiments that the catalyst comprise from about 5% to about 20% by weight, more preferably from about 5% to about 15% by weight, of metal and even more preferably zinc and/or bismuth. Preferred among the amidine compounds for certain embodiments are those which contain catalytic amidine groups, particularly those having a heterocyclic ring (with the linking preferably being —N═C—N—), for example an imidazoline, imidazole, tetrahydropyrimidine, dihydropyrimidine or pyrimidine ring. Acyclic amidines and guanidines can alternatively be used. One preferred catalyst complex/composition comprises zinc (II), a methyl, ethyl, or propyl hexannoate, and a imidazole (preferably an lower alkylimidazole such as methylimidazole. A preferred catalyst comprises $Zn(1\text{-methylimidazole})_2(2\text{-ethylhexannoate})_2$, together with, di-ethylene glycol, preferably as a solvent for the catalyst, and a preferred form of such a preferred catalyst is sold under the trade designation K-Kat XK-614 by King Industries of Norwalk, Conn. A preferred form of such bismuth-based catalyst is such a catalyst in a solution comprising from about 25% to about 50% metal carboxylate, and even more preferably from about 35% to about 40% metal carboxylate, with the percentage of metal being from about 5% to about 20%, and even more preferably from about 10% to about 15%. Such a preferred catalyst has a specific gravity at 25 C (g/ml) of 1.12 The preferred precipitation resistant catalysts of the present invention can generally be made in accordance with the teaching of U.S. Pat. No. 7,485,729, which is incorporated herein in its entirety as if fully set forth below. Another preferred catalyst according to the present invention comprises a bismuth carboxylate, preferably a chelated bismuth carboxylate, and is preferably a precipitation resistant catalyst. A preferred form of such bismuth-based catalyst is such a catalyst in a solution comprising from about 25% to about 50% metal carboxylate, and even more preferably from about 35% to about 40% metal carboxylate, with the percentage of metal being from about 5% to about 20%, and even more preferably from about 10% to about 15%. Such a preferred catalyst has a specific gravity at 25 C (g/ml) of 1.12 and is sold under the trade designation K-Kat XC-227 by King Industries of Norwalk, Conn.

In certain highly preferred embodiments, the catalyst used in accordance with the present invention comprises both a zinc-based metal catalyst and a bismuth-based metal catalyst. Although it is contemplated many such combinations may be used in accordance with the present invention, it is generally preferred that the weight ratio of the zinc-based metal catalyst to the bismuth-based metal catalyst is from 4:1 to about 1:1, and even more preferably from about 4:1 to about 2:1, and even more preferably from about 2.5:1 to about 3.5:1.

Certain preferred catalysts according to the present invention include catalyst numbers 9, 12, 15, 21, 24, and 27 in table 2 of U.S. Pat. No. 7,485,729. A copy of the MSDS for the catalyst sold under the trade designation K-Kat XK-614 is attached as Attachment A to above-noted provisional application and incorporated therein by reference, and a copy of the Preliminary Data Sheet for this catalyst is attached as Attachment B to the above-noted provisional and incorporated therein by reference.

According to one aspect, this invention relates to rigid to semi-rigid, polyurethane and polyisocyanurate foams and methods for their preparation, which foams are characterized by a fine uniform cell structure and little or no foam collapse. The foams are preferably produced with an organic polyisocyanate and a polyol premix composition which comprises a combination of a blowing agent, which is preferably a hydrohaloolefin, a polyol, a silicone surfactant, and a catalyst in which catalyst comprises one or more non-amine catalyst, preferably an inorgano- or organo-metallic compound and/or a carboxylate catalyst, preferably a quaternary ammonium carboxylate catalyst, and also may include one or more amine catalysts, preferably in a minor proportion based on all the catalysts in the system. Although it is contemplated that the amount of metal-based catalyst and amine-based catalyst may vary according to the broad aspects of the present invention, in certain embodiments it is preferred that the weight ratio of amine-based catalyst to metal based catalyst, and even more preferably metal catalyst based on zinc or bismuth or combinations of catalysts based on these two metals, is from about 1:1 to about 1:4 and more preferably from about 1:1 to about 1:3, and even more preferably from about 1:1 to about 1:1.5.

BRIEF DESCRIPTION ON OF THE DRAWINGS

FIG. 5 is a table labeled as Table 2A.

DETAILED DESCRIPTION OF PREFERRED EMBODIMENTS

Figure 1:
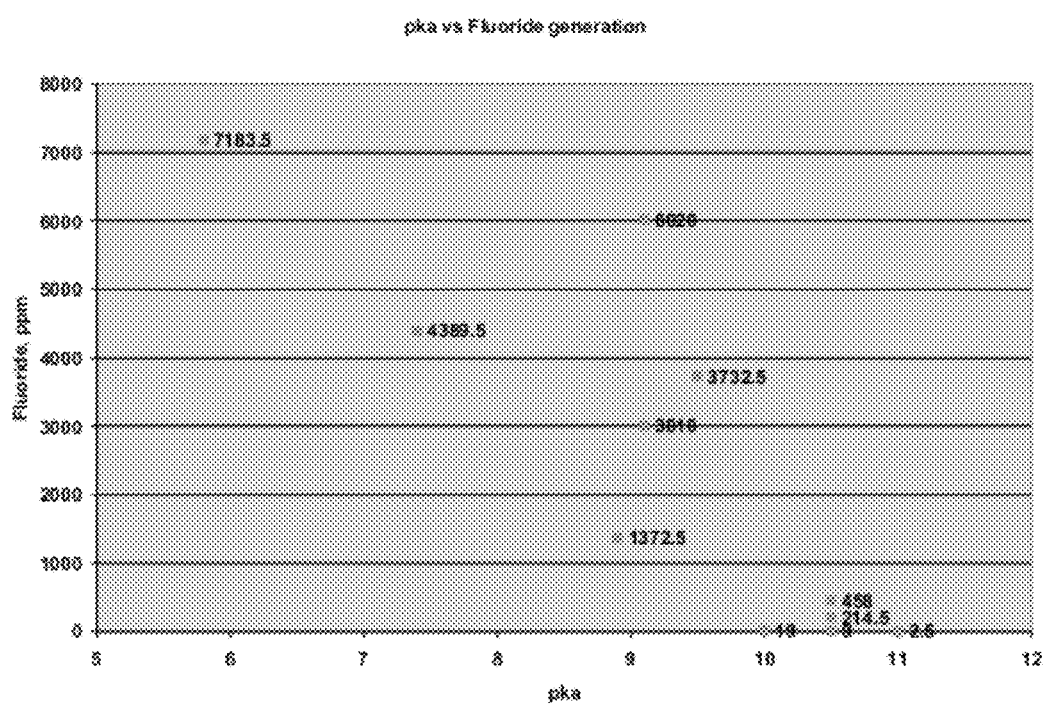
FIG. 1 is a graphical representation of the results according to the description in Table B.

Although applicants do not intend to be bound by or to any particular theory of operation, it is believed that the deleterious effects observed by applicants may be occurring as a result of the reaction between the hydrohaloolefin blowing agent and the amine catalysts, one example of such a possible reaction scheme being illustrated below:

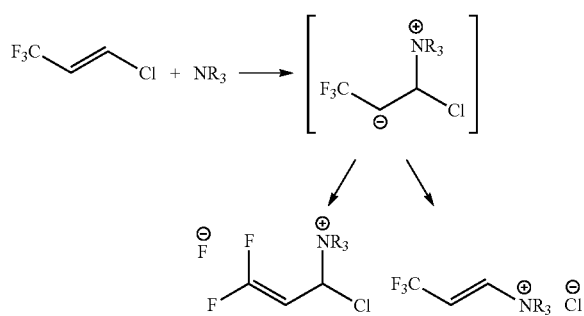

It is believed that this reaction scheme or similar reaction schemes produce a halogen ion, such as a fluorine ion or chlorine ion, which leads to a decrease in the reactivity of the blowing agent. In addition, applicants believe that the deleterious effects may also be caused, either alone or in addition to the above causes, by the halogen ion, such as fluoride, produced from the above noted reaction in turn reacting with silicone surfactant present in such blowing agents and related systems to produce a lower average molecular weight surfactant, which is then a less effective than originally intended. This depletion/degradation of the surfactant is believe to tend to reduce the integrity of the cell wall and hence tends to produce a foam that is subject higher than desired levels of cell collapse.

The invention in another aspect provides a high-water content polyol premix composition which comprises a combination of a blowing agent, one or more polyols, one or more silicone surfactants, and a catalyst comprising a precipitation-resistant metal catalyst, more preferably a precipitation-resistant zinc-based catalyst, a precipitation-resistant bismuth-based catalyst, and even more preferably a combination of precipitation-resistant zinc-based catalyst and precipitation-resistant bismuth-based catalyst, including particularly preferably the zinc-based and bismuth based carboxylate catalysts described above. In certain preferred embodiments the catalyst comprising the components (a)-(c) mentioned above (preferably formed as indicated in U.S. Pat. No. 7,485,729), wherein the blowing agent comprises one or more hydrohaloolefins, and optionally a hydrocarbon, fluorocarbon, chlorocarbon, hydrochlorofluorocarbon, hydrofluorocarbon, halogenated hydrocarbon, ether, ester, alcohol, aldehyde, ketone, organic acid, gas generating material, water or combinations thereof. One preferred catalyst comprising an amine catalyst and a precipitation-resistant metal catalyst comprising a combination of a zinc-based carboxylate catalyst, such as the catalyst sold under the trade designation K-Kat XK-614 by King Industries of Norwalk, Conn., and a bismuth-based metal carboxylate catalyst, such as the catalyst sold under the trade designation K-Kat XC-227 by King Industries of Norwalk, Conn. The invention provides polyol premix composition which comprises a combination of a blowing agent, one or more polyols, one or more silicone surfactants, and a catalyst in which said catalyst comprises in major proportion, and even more preferably consists essentially of a non-amine catalyst, such as an inorgano- or organometallic compound or quaternary ammonium carboxylate material. In certain embodiments, the non-amine catalyst can be used either alone or in combination with amine catalysts, wherein the blowing agent comprises one or more hydrohaloolefins, and optionally a hydrocarbon, fluorocarbon, chlorocarbon, hydrochlorofluorocarbon, hydrofluorocarbon, halogenated hydrocarbon, ether, ester, alcohol, aldehyde, ketone, organic acid, gas generating material, water or combinations thereof.

The invention also provides a method of preparing a polyurethane or polyisocyanurate foam comprising reacting an organic polyisocyanate with the polyol premix composition.

The Hydrohaloolefin Blowing Agent

The blowing agent component comprises a hydrohaloolefin, preferably comprising at least one or a combination of 1234ze(E), 1233zd(E), and isomer blends thereof, and/or 1336mzzm(Z), and optionally a hydrocarbon, fluorocarbon, chlorocarbon, fluorochlorocarbon, halogenated hydrocarbon, ether, fluorinated ether, ester, alcohol, aldehyde, ketone, organic acid, gas generating material, water or combinations thereof.

The hydrohaloolefin preferably comprises at least one halooalkene such as a fluoroalkene or chlorofluoroalkene containing from 3 to 4 carbon atoms and at least one carbon-carbon double bond. Preferred hydrohaloolefins non-exclusively include trifluoropropenes, tetrafluoropropenes such as (1234), pentafluoropropenes such as (1225), chlorotrifloropropenes such as (1233), chlorodifluoropropenes, chlorotrifluoropropenes, chlorotetrafluoropropenes, hexafluorobutenes (1336) and combinations of these. More preferred for the compounds of the present invention are the tetrafluoropropene, pentafluoropropene, and chlorotrifloropropene compounds in which the unsaturated terminal carbon has not more than one F or Cl substituent. Included are 1,3,3,3-tetrafluoropropene (1234ze); 1,1,3,3-tetrafluoropropene; 1,2,3,3-pentafluoropropene (1225ye), 1,1,1-trifluoropropene; 1,2,3,3,3-pentafluoropropene, 1,1,1,3,3-pentafluoropropene (1225zc) and 1,1,2,3,3-pentafluoropropene (1225yc); (Z)-1,1,1,2,3-pentafluoropropene (1225yez); 1-chloro-3,3,3-trifluoropropene (1233zd), 1,1,1,4,4,4-hexafluorobut-2-ene (1336mzzm) or combinations thereof, and any and all stereoisomers of each of these.

Preferred hydrohaloolefins have a Global Warming Potential (GWP) of not greater than 150, more preferably not greater than 100 and even more preferably not greater than 75. As used herein, "GWP" is measured relative to that of carbon dioxide and over a 100-year time horizon, as defined in "The Scientific Assessment of Ozone Depletion, 2002, a report of the World Meteorological Association's Global Ozone Research and Monitoring Project," which is incorporated herein by reference. Preferred hydrohaloolefins also preferably have an Ozone Depletion Potential (ODP) of not greater than 0.05, more preferably not greater than 0.02 and even more preferably about zero. As used herein, "ODP" is as defined in "The Scientific Assessment of Ozone Depletion, 2002, A report of the World Meteorological Association's Global Ozone Research and Monitoring Project," which is incorporated herein by reference.

Coblowing Agents

Preferred optional co-blowing agents non-exclusively include water, organic acids that produce $CO_2$ and/or CO, hydrocarbons; ethers, halogenated ethers; esters, alcohols, aldehydes, ketones, pentafluorobutane; pentafluoropropane; hexafluoropropane; heptafluoropropane; trans-1,2 dichloroethylene; methylal, methyl formate; 1-chloro-1,2,2,2-tetrafluoroethane (124); 1,1-dichloro-1-fluoroethane (141b); 1,1,1,2-tetrafluoroethane (134a); 1,1,2,2-tetrafluoroethane (134); 1-chloro 1,1-difluoroethane (142b); 1,1,1,3,3-pentafluorobutane (365mfc); 1,1,1,2,3,3,3-heptafluoropropane (227ea); trichlorofluoromethane (11); dichlorodifluoromethane (12); dichlorofluoromethane (22); 1,1,1,3,3,3-hexafluoropropane (236fa); 1,1,1,2,3,3-hexafluoropropane (236ea); 1,1,1,2,3,3,3-heptafluoropropane (227ea), difluoromethane (32); 1,1-difluoroethane (152a); 1,1,1,3,3-pentafluoropropane (245fa); butane; isobutane; normal pentane; isopentane; cyclopentane, or combinations thereof. In certain embodiments the co-blowing agent(s) include one or a combination of water and/or normal pentane, isopentane or cyclopentane, which may be provided with one or a combination of the hydrohaloolefin blowing agents discussed herein. The blowing agent component is preferably present in the polyol premix composition in an amount of from about 1 wt. % to about 30 wt. %, preferably from about 3 wt. % to about 25 wt. %, and more preferably from about 5 wt. % to about 25 wt. %, by weight of the polyol premix composition. When both a hydrohaloolefin and an optional blowing agent are present, the hydrohaloolefin component is preferably present in the blowing agent component in an amount of from about 5 wt. % to about 90 wt. %, preferably from about 7 wt. % to about 80 wt. %, and more preferably from about 10 wt. % to about 70 wt. %, by weight of the blowing agent components; and the optional blowing agent is preferably present in the blowing agent component in an amount of from about 95 wt. % to about 10 wt. %, preferably from about 93 wt. % to about 20 wt. %, and more preferably from about 90 wt. % to about 30 wt. %, by weight of the blowing agent components.

Polyol Component

The polyol component, which includes mixtures of polyols, can be any polyol or polyol mixture which reacts in a known fashion with an isocyanate in preparing a polyurethane or polyisocyanurate foam. Useful polyols comprise one or more of a sucrose containing polyol; phenol, a phenol formaldehyde containing polyol; a glucose containing polyol; a sorbitol containing polyol; a methylglucoside containing polyol; an aromatic polyester polyol; glycerol; ethylene glycol; diethylene glycol; propylene glycol; graft copolymers of polyether polyols with a vinyl polymer; a copolymer of a polyether polyol with a polyurea; one or more of (a) condensed with one or more of (b), wherein (a) is selected from glycerine, ethylene glycol, diethylene glycol, trimethylolpropane, ethylene diamine, pentaerythritol, soy oil, lecithin, tall oil, palm oil, and castor oil; and (b) is selected from ethylene oxide, propylene oxide, a mixture of ethylene oxide and propylene oxide; and combinations thereof. The polyol component is usually present in the polyol premix composition in an amount of from about 60 wt. % to about 95 wt. %, preferably from about 65 wt. % to about 95 wt. %, and more preferably from about 70 wt. % to about 90 wt. %, by weight of the polyol premix composition.

Surfactant

The polyol premix composition preferably also contains a silicone surfactant. The silicone surfactant is preferably used to form a foam from the mixture, as well as to control the size of the bubbles of the foam so that a foam of a desired cell structure is obtained. Preferably, a foam with small bubbles or cells therein of uniform size is desired since it has the most desirable physical properties such as compressive strength and thermal conductivity. Also, it is critical to have a foam with stable cells which do not collapse prior to forming or during foam rise.

Silicone surfactants for use in the preparation of polyurethane or polyisocyanurate foams are available under a number of trade names known to those skilled in this art. Such materials have been found to be applicable over a wide range of formulations allowing uniform cell formation and maximum gas entrapment to achieve very low density foam structures. The preferred silicone surfactant comprises a polysiloxane polyoxyalkylene block co-polymer. Some representative silicone surfactants useful for this invention are Momentive's L-5130, L-5180, L-5340, L-5440, L-6100, L-6900, L-6980 and L-6988; Air Products DC-193, DC-197, DC-5582, and DC-5598; and B-8404, B-8407, B-8409 and B-8462 from Evonik Industries AG of Essen, Germany. Others are disclosed in U.S. Pat. Nos. 2,834,748; 2,917,480; 2,846,458 and 4,147,847. The silicone surfactant component is usually present in the polyol premix composition in an amount of from about 0.5 wt. % to about 5.0 wt. %, preferably from about 1.0 wt. % to about 4.0 wt. %, and more preferably from about 1.5 wt. % to about 3.0 wt. %, by weight of the polyol premix composition.

The polyol premix composition may optionally contain a non-silicone surfactant, such as a non-silicone, non-ionic surfactant. Such may include oxyethylated alkylphenols, oxyethylated fatty alcohols, paraffin oils, castor oil esters, ricinoleic acid esters, turkey red oil, groundnut oil, paraffins, and fatty alcohols. A preferred non-silicone non-ionic surfactant is LK-443 which is commercially available from Air Products Corporation. When a non-silicone, non-ionic surfactant used, it is usually present in the polyol premix composition in an amount of from about 0.25 wt. % to about 3.0 wt. %, preferably from about 0.5 wt. % to about 2.5 wt. %, and more preferably from about 0.75 wt. % to about 2.0 wt. %, by weight of the polyol premix composition.

The Catalyst System

Applicants have generally found that it is difficult to identify amine catalysts which generate relatively low levels of halogen ions, such as fluoride and chloride, when in contact with hydrohaloolefins while at the same time possessing sufficient activity characteristics to be acceptable for use in producing foams when used alone. In other words, applicants have found that a large number of amine catalysts can be identified which are relatively stable when in the presence of hydrdohaloolefins, but that such catalysts are generally not sufficiently active to provide the necessary foam reactivity. On the other hand, applicants have also found that a relatively large number of amine catalysts can be identified which are sufficiently active to produce acceptable foam reactivity but that such catalysts are generally not sufficiently stable for use in combination with hydrdohaloolefins, as measured by the generation of fluoride.

Applicants have tested a large number of amine catalyst to determine the physical and/or chemical interaction with certain hydrohaloolefins, and to identify and assess the stability of same. Some of the catalysts tested are identified in Table A below:

TABLE A

| Trade name | Chemical name | Formula | MW | % Amine in Catalyst* |
|---|---|---|---|---|
| Curithane ® 52 | Methyl(n-methyl amino b-sodium acetate nonyl phenol) 2- | 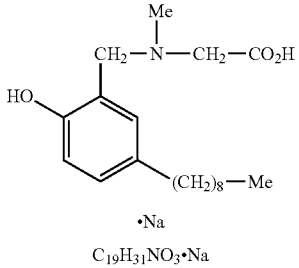<br>$C_{19}H_{31}NO_3 \cdot Na$ | 343 | 50 |
| Dabco ® TMR-30 | Tris-2,4,6-(dimethylamonomethyl) phenol | 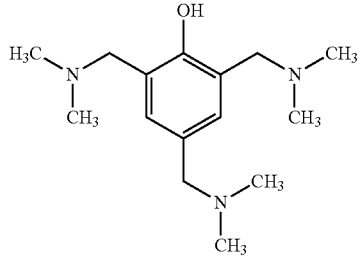<br>$C_{15}H_{27}N_3O$<br>$[(CH_3)_2NCH_2]_3C_6H_2OH$ | 265 | 90 |
| | Bis (dimethylaminomethyl) phenol | 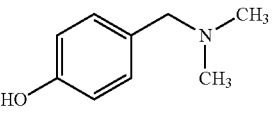<br>$C_9H_{13}NO$ | 151 | 15 |
| Dabco ® DEOA-LF Cross linker | Diethanol amine | 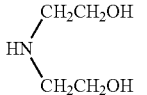 | 105 | 85 |
| | Water | | | 15 |
| Ethacure ® 100 curing agent (DETDA) | Diethyltoluenediamine | 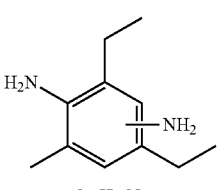<br>$C_{11}H_{18}N_2$ | 178 | 100 |
| Ethacure ® 300 Curative | 1,3,benzenediamine 4-methyl-2,6-bis (methylthio) | 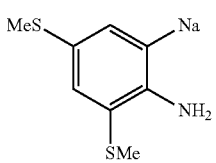<br>D1-NH$_2$<br>$C_9H_{14}N_2S_2$ | 214 | NS |
| | 1,3-benzenediamine 2-methyl-4,6-bis (methylthio) | | | NS |

TABLE A-continued

| Trade name | Chemical name | Formula | MW | % Amine in Catalyst* |
|---|---|---|---|---|
| 1-methyl-imidazole | 1-Methylimidazole | 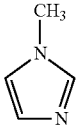<br>$C_4H_6N_2$ | 82 | 100 |
| Jeffcat ® ZR 70 | Dimethylaminoethoxy-ethanol | 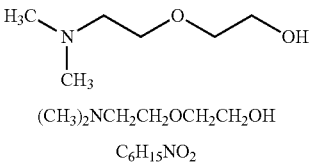<br>$(CH_3)_2NCH_2CH_2OCH_2CH_2OH$<br>$C_6H_{15}NO_2$ | 133 | 99 |
|  | Ethylene gylcol |  |  | 1 |
| Jeffamine ® D 230 | Polyoxypropylene-diamine | 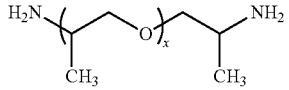<br>JEFFAMINE®    x<br>D-230    ~2.5 | 230 | 100 |
| Jeffamine ® T 5000 | Glycerol poly(oxypropylene) triamine | 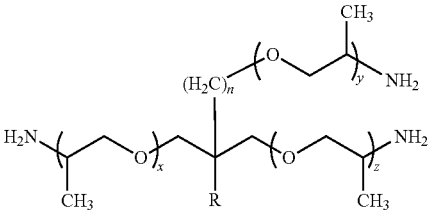<br>                          Moles PO<br>JEFFAMINE®   R   n   (x + y + z)<br>T-5000    H   0      85 | 5000 | 100 |
| Polycat ® 5 | Pentamethyldiethylene-triamine | 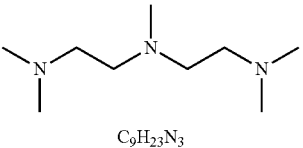<br>$C_9H_{23}N_3$ | 173 | NS |
| Polycat ® 12 | N-Methyldicyclohexyl-amine | 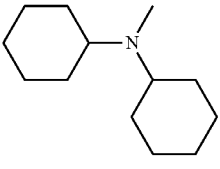<br>$(C_6H_{11})_2NCH_3$ | 195 | NS |
| Dabco ® H-1010 | Unidentified amine salt in water (50%) |  |  | 24 |

*wt % of the indicated molecule in the total catalyst, with the remainder being a carrier such as water, glycol and the like.

Applicants tested the compatibility of the catalyst with the gaseous and/or liquid blowing agent by use of a pressure reaction vessel. Three grams of catalyst is added to a tarred reaction vessel and it is sealed. After sealing, 3 grams of the blowing agent, such as 1234ze(E), is added through a gas port into the vessel. The contents are mixed and the final weight is recorded. The vapor pressure is taken of the initial solution and a picture is taken to document the color and consistency of the solution and catalyst. The tube is then placed in a 54° C. oven for 24 hours. Twice during the 24 hours the vapor pressure of the solution is measured at the elevated temperature. The solution is removed from the oven and allowed to cool. The vapor pressure is measured and a picture of the solution is taken. The pressure is released from the pressure reaction vessel. The remaining solution is dissolved in de-ionized water to a final volume of 100 ml. The fluoride and chloride concentration is determined by Ion Chromatography.

Applicants measured fluoride generation when each catalysts is exposed to 1234ze(E) for 24 hours at 54° C. The results are reported in Table B below:

TABLE B

| Catalyst ID | Chemical Identification | Structure | pka | F ppm after 24 hours |
|---|---|---|---|---|
| Ethacure ® 300 Curative | 1,3,benzenediamine 4-methyl-2,6-bis (methylthio) | Major | 11 | 3 |
| | 1,3-benzenediamine 2-methyl-4,6-bis (methylthio) | Minor | | 2 |
| Ethacure ® 100 curing agent (DETDA) | Diethyltoluenediamine | Major | 11-10 | 11 |
| | | Minor | | 7 |
| Polycat ® 12 | N-Methyldicyclohexyl-amine | | 10 | 20 18 |

TABLE B-continued

| Catalyst ID | Chemical Identification | Structure | pka | F ppm after 24 hours |
|---|---|---|---|---|
| Jeffamine ® T 5000 | Glycerol poly(oxypropylene) triamine | [structure] | — | 263<br>166 |
| Curithane ® 52 | Methyl(n-methyl amino b-sodium acetate nonyl phenol) 2- | [structure] ·Na | 10-11 | 468<br>448 |
| Dabco ® H-1010 | Amine salt in solvent 24% amine remainder water | | | 634<br>663 |
| Dabco ® DEOA-LF Cross linker | Diethanol amine | $HN(CH_2CH_2OH)_2$ | 8.9 | 1378<br>1367 |
| Polycat ® 5 | Pentamethyldiethylene-triamine | [structure] | 9.1<br>8.0<br>2.4 | 2942<br>3078 |
| Jeffamine ® D 230 | polyoxypropylenediamine | [structure] | 9.5 | 3751<br>3714 |
| 1-methyl-imidazole | 1-Methylimidazole | [structure] | 7.4 | 4372<br>4407 |
| Jeffcat ® ZR 70 | Dimethylamino ethoxyethanol Ethylene glycol | [structure] | 9.1 | 6015<br>6025 |
| Dabco ® TMR-30 | Tris-2,4,6-(dimethylamino-methyl)-phenol | [structure] | 5.8 | 6790 |
| | Bis(dimethylamino-methyl)-phenol | [structure] | | 7577 |

Applicants plotted the results of this experimentation, as illustrated in FIG. 1.

Figure 2:
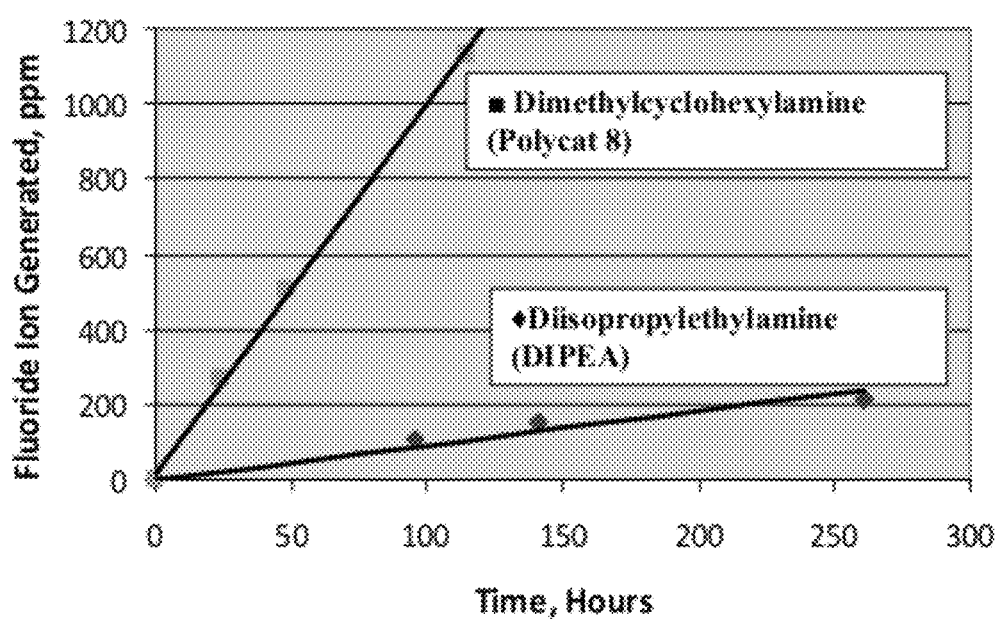
FIG. 2 is a graphical representation of the results of testing regarding reaction rates as described in the specification

Applicants have also tested the compatibility of the catalyst with the gaseous blowing agent by us of a pressure reaction vessel as described above containing a 50/50 solution of blowing agent, such as 1234ze(E), and catalyst. The tube is then placed in a 54° C. oven for an extended period of time and the fluoride concentration is determined by Ion Chromatography after increasing periods of time according to the procedure describe above. The results, which are depicted in FIG. 2 hereof, show that tertiary amine catalysts react at various rates with the hydrohalofin blowing agents, with the rate being generally inversely correlated with the extent of steric crowding around the amine nitrogen.

Based on the above noted experimental results, applicants have found that the stability of a particular amine catalyst is related partially to steric hinderance of the amine group and also to the pKa of the amine. In particular, applicants have found that it is highly desirable to select an amine catalyst, if such a catalyst is to be used, that has a pKa of not less than about 10.

Applicants also analyzed the relationship between fluoride ion generation and the vapor pressure of the solution containing the blowing agent and the catalyst after time. These results are reported in Table C below:

TABLE C

| Catalyst ID | F⁻ ppm after 24 hours | Initial | Vapor Pressure @ RT, psig 24 hours | Delta |
|---|---|---|---|---|
| Ethacure ® 300 Curative | 3 | 52 | 53 | +1 |
| Ethacure ® 300 Curative | 2 | 46 | 41 | −5 |
| Ethacure ® 100 curing agent (DETDA) | 11 | 38 | 44 | +6 |
| Ethacure ® 100 curing agent (DETDA) | 7 | 48 | 49 | +1 |
| Polycat ® 12 | 20 | 62 | 63 | +1 |
| Polycat ® 12 | 18 | 62 | 64 | +2 |
| Jeffamine ® T 5000 | 263 | 53 | 52 | −1 |
| Jeffamine ® T 5000 | 166 | 58 | 55 | −3 |
| Curithane ® 52 | 468 | 72 | 66 | −6 |
| Curithane ® 52 | 448 | 66 | 60 | −6 |
| Dabco ® H-1010 | 634 | 62 | 69 | +7 |
| Dabco ® H-1010 | 663 | 62 | 69 | +7 |
| Dabco ® DEOA-LF Cross linker | 1378 | 73 | 66 | −7 |
| Dabco ® DEOA-LF Cross linker | 1367 | 74 | 66 | −8 |
| Polycat ® 5 | 2942 | 29 | 22 | −7 |
| Polycat ® 5 | 3078 | 33 | 36 | +3 |
| Jeffamine ® D 230 | 3751 | 43 | 57 | +14 |
| Jeffamine ® D 230 | 3714 | 45 | 60 | +15 |
| 1-methylimidazole | 4372 | 38 | 17 | −21 |
| 1-methylimidazole | 4407 | 37 | 15 | −22 |
| Jeffcat ® ZR 70 | 6015 | 42 | 24 | −18 |
| Jeffcat ® ZR 70 | 6025 | 40 | 24 | −16 |
| Dabco ® TMR-30 | 6790 | 43 | 12 | −21 |
| Dabco ® TMR-30 | 7577 | 48 | 9 | −39 |

Based on the results obtained as reported in Table C, applicants have found that there is a strong correlation between decrease in vapor pressure (an indication of a decrease in blowing effectiveness) and the increase in generation of F- in the catalyst/hydrohalogen blowing agent (such as 1234ze(E)) test solutions at room temperature. At a fluoride concentration of >4000 ppm there is a consistent loss in vapor pressure. However, applicants have found a surprising and unexpected results with regard to the interrelationship between the catalyst Jeffamine D 230 and 1234ze(E), and in particular that this combination actually results in an increase in vapor pressure over time even though the levels of fluoride generation are significant and nearly at a level of approximately 4000 ppm.

Based on testing performed by applicants, the following catalysts have been found to have the relative fluoride generation as indicated below in the presence of 1234ze(E).

TABLE 1

| | 1234ze(E) | |
|---|---|---|
| CATALYST NO. | CATALYST | PPM, F− |
| 1 | diazabicyclo undecane | 226,944 |
| 2 | Diazabicyclooctane (triethylenediamine) | 99,000 |
| 3 | Tris-2,4,6-(dimehtylamino-methyl)-phnol/Bis(dimehtylaminomethyl)-phenol | 7184 |
| 4 | Dimethylaminoethoxyethanol/ethylene glycol | 6020 |
| 5 | 1-methylimidazole | 4390 |
| 6 | polyoxypropylenediamine | 3732 |
| 7 | Pentamethyldiethylene-triamine | 3242 |
| 8 | Diethylcyclohexl | 1970 |
| 9 | diethanolamine | 1372 |
| 10 | N-mtheyldicyclohexyl-amine | 480 |
| 11 | Methyl(n-methylamino b-sodium acetate nonylphenol) 2- | 458 |
| 12 | Glycerol poly(oxypropylene) triamine | 216 |
| 13 | Diisopropylethylamine | 67 |
| 14 | Diethyltoluenediamine | 10 |
| 15 | 1,3,benzenediamine 4-methyl-2,6-bis(mehtylthio)/1,3-benzenediamine 2-methyl-4,6-bis (mehtylthio) | 3 |

In addition to the above, applicants have tested the reactivity of several of the above-noted catalysts, as measured by Gel Time in seconds in a typical panel foam formulation with the blowing agent consisting of 1234ze(E). The results are reported in Table 2B provided below and FIG. 5.

Time to Foam Collapse, Days

TABLE 2B

| | GEL TIMES, SEC | | | |
|---|---|---|---|---|
| CATALYSTS (FROM CHART ABOVE) | INITIAL | 2.5 DAYS | 14 DAYS | CHANGE % |
| PMDETA-Std | 78 | — | — | — |
| PMDETA/Acid Block | 270 | — | — | — |
| PMDETA/Scavenger | 75 | 88 | — | +17 |
| DMCHA | 140 | 145 | — | +3.5 |
| Dicyclohexylmethyl | 225 | 280 | 290 | +29 |
| Dicyclohexylmethyl/ Dibutyltin Dilaurate | 55 | 65 | 72 | +31 |
| Diisopropylethyl | 310 | 370 | 375 | 21 |

Based upon the testing done by applicants, applicants have found that for blowing agents comprising, and preferably consisting essentially of 1234ze(E), the catalysts numbered 1-9 in Table 1 above are not generally preferred because of stability problems, as indicated by the high level of fluoride concentration. On the other hand, applicants have found that the catalysts numbered 12-15, while demonstrating a high level of stability, are generally not preferred because they are believed to be of not sufficient activity to produce acceptable foam reactivity. Unexpectedly and surprisingly, applicants have found that the catalysts numbered 10 and 11, namely, n-metheyldicyclohexyl-amine and methyl(n-methylamino b-sodium acetate nonylphenol) 2- are preferred in accordance with the present invention because they exhibit a highly desirable but difficult to achieve combination of stability and activity when used in combination with hydrohaloolefins.

Applicants have also surprisingly and unexpectedly found that from among hydrohaloolefins, 1233zd(E) is substantially less reactive with amine-catalysts in comparison to other hydrohaloolefins, and in particular hydrohalogenated propenes. More specifically, applicants have found as a result of testing that the following catalysts have the relative fluoride generation as indicated below in the presence of 1233zd(E) as reported in Table 3 below.

TABLE 3

1233zd(E)

| CATALYST NO./Tradename | CATALYST | PPM, F- |
|---|---|---|
| 1 Polycat DBU | DBU | 26,994 (estimated) |
| 2. Dabco 33LV | Diazabicyclooctane (triethylenediamine) | 9900 (estimated) |
| 2A Jeffamine D 230 | Polyoxypropylenediamine (Jeffamine D 230) | 2157 |
| 3 Dabco TMR-30 | Tris-2,4,6-(dimehtylamino-methyl)-phnol/Bis(dimehtylaminomethyl)-phenol | 1521 |
| 4 Jeffcat ZR 70 | Dimethylaminoethoxyethanol/ethylene glycol | 1753 |
| Toyocat RX5 | Bis(dimehtylaminoethyl) ether (Toyocat RX5) | 1002 |
| Polycat 9 | Bis(dimethylaminopropyl)-n (Polycat 9) | 754 |
| Polycat 30 | Tertiary amine (10-30%), gelling catalyst (30-60%) fatty amine (10-30%) | 548 |
| 5 Lupragen 1-methyl imidazole | 1-methylimidazole | 221 |
| 6 | polyoxypropylenediamine | 1919 |
| 7 Polycat 5 | Pentamethyldiethylene-triamine | 429 |
| Polycat 41 | Dimethylaminopropylhexahydrotriuazine, N,N',N" | 392 |
| 8 | Diethylcyclohexl | NT |
| 9 Dabco DEOA-LF | diethanolamine | 343 |
| Lupragen 1-methyl imidazole | 1-methylimidazole | 221 |
| Dabco H1010 | 50/50 blend water + amine salt | 171 |
| Toyocat DM70 | 70% 1,2 dimethylimidazole, 30% ethyleneglycol | 170 |
| Toyocat TRX | Trimerized catalyst | 129 |
| N-Methylmorpholine | N-methylmorpholine | 102 |
| DIPEA | Diisopropylethylamine | 67 |
| 10 Polycat 12 | n-methyldicyclohexyl-amine | 15 |
| 11 Curithane 52 | Methyl(n-methylamino b-sodium acetate nonylphenol) 2- | 190 |
| 12 Jeffamine T5000 | Glycerol poly(oxypropylene) triamine | 49 |
| K-Kat x614 Zinc | Zinc catalyst complex | 36 |
| Jeffcat DMDEE | 2,2-dimorpholineodiethylether | 24 |
| Polycat 12 | N-methyldicyclohexyl-amine | 15-22 |
| Firstcure N,N-Dimethylparatoluidine | N,N-dimethylparatoluuidine | 20 |
| Ethacure 300 Curative | 3,5-dimethythio-2,4-toluenediamine | 9-16 |
| Tyzor TE Titanium | Titanium complex | 10 |
| Dabco MB20 | Bismuth carboxylate catalyst | 6 |
| Borchi Oxycoat 1101 | Iron catalyst | 2 |
| PUCAT 25 | Bismuth 2-ethylhexanoate (25%) | 1 |
| 13 | Diisopropylethylamine | NT |
| 14 Ethacure 100 curing agent | Diethyltoluenediamine | 24 |
| 15 Ethacure 300 Curative | 1,3,benzenediamine 4-methyl-2,6-bis(mehtylthio)/1,3-benzenediamine 2-methyl-4,6-bis (mehtylthio) | 16 |

NT—not tested

As can be seen from the results reported above, applicants have found that 1233zd(E) is many times more stable, as measured by fluoride ion generation, in the presence of amine catalysts than are other halogenated olefins, and particularly the tetra-fluorinated propenes such as 1234ze. Moreover, an even more unexpectedly, applicants have found that 1-methylimidazole exhibits an exceptionally high level of stability while retaining a relatively high level of foam reactivity when used in combination with 1233zd(E). Similarly, applicants have unexpectedly found that n-methyldicyclohexyl-amine exhibits an exceptionally high level of stability while retaining a relatively high level of foam reactivity when used in combination with 1233zd(E).

Notwithstanding the unexpected and advantageous results described above regarding combinations of halogenated olefins and certain amine catalysts, applicants have found that even the best of such combinations is not fully satisfactory for many embodiments, and that further substantial and unexpected improvement can be achieved by replacing all or a substantial portion of the amine catalyst(s) with one or more metal catalysts, and even more preferably two or more catalysts wherein at least a first and a second of said catalysts is based upon a different metal. In general, applicants have found that metal catalysts are relatively nonreactive with halogenated olefins that are adaptable for use as blowing agents and therefore appear to produce a relatively stable system, and that with a judicious selection of at least a first and second metal catalyst surprisingly effective and stable compositions, systems and methods can be obtained.

Applicants have found that the use of a catalyst system based upon a single metal in many embodiments is not capable of fully satisfying the desired reactivity profile for the foamable composition and/or method. Applicants have found that surprising and highly beneficial results can be achieved in certain embodiments by the selection of catalyst systems comprising a first metal catalyst wherein said first metal is selected from a metal catalysts exhibiting relatively high activity at low temperatures and a second metal catalyst wherein said second metal is selected from the catalytic metals tending to exhibit relatively high activity at higher temperatures. In certain preferred embodiments, the metal of the first metal catalyst is selected from the group consisting of kin, zinc, cobalt, lead and combinations of these, with catalyst comprising and even more preferably consisting essentially of zinc-based metal catalysts (and even more preferably organozinc-metal-based catalysts) being especially preferred. In certain preferred embodiments, the metal of the second metal catalyst is selected from the group consisting of bismuth, sodium, calcium and combinations of these, with catalyst comprising and even more preferably consisting essentially of bismuth-based metal catalysts (and even more preferably organobismuth-metal-based catalysts) being especially preferred. In highly preferred embodiments of the present invention, the catalyst system comprises a first metal catalyst and a second metal catalyst according to the broad and preferred aspects of the present invention but but contains less than 50% by weight, based on the total weight of catalyst, of amine-based catalyst, and in certain preferred embodiments is substantially free of amine catalyst.

Furthermore, applicants have found that blowing agents and foamable systems that are highly desirable in certain embodiments can be obtained by utilizing one or more of the preferred amine catalysts of the present invention in combination with at least one, and preferably at least two, metal catalysts according to the invention as described above.

In certain embodiments, the non-amine catalysts are inorgano- or organo-metallic compounds. Useful inorgano- or organo-metallic compounds include, but are not limited to, organic salts, Lewis acid halides, or the like, of any metal, including, but not limited to, transition metals, post-transition (poor) metals, rare earth metals (e.g. lanthanides), metalloids, alkali metals, alkaline earth metals, or the like. According to certain broad aspects of the present invention, the metals may include, but are not limited to, bismuth, lead, tin, zinc, chromium, cobalt, copper, iron, manganese, magnesium, potassium, sodium, titanium, mercury, zinc, antimony, uranium, cadmium, thorium, aluminum, nickel, cerium, molybdenum, vanadium, zirconium, or combinations thereof. Non-exclusive examples of such inorgano- or organo-metallic catalysts include, but are not limited to, bismuth nitrate, lead 2-ethylhexoate, lead benzoate, lead naphthanate, ferric chloride, antimony trichloride, antimony glycolate, tin salts of carboxylic acids, dialkyl tin salts of carboxylic acids, potassium acetate, potassium octoate, potassium 2-ethylhexoate, potassium salts of carboxylic acids, zinc salts of carboxylic acids, zinc 2-ethylhexanoate, glycine salts, alkali metal carboxylic acid salts, sodium N-(2-hydroxy-5-nonylphenol)methyl-N-methylglycinate, tin (II) 2-ethylhexanoate, dibutyltin dilaurate, or combinations thereof. In certain preferred embodiments the catalysts are present in the polyol premix composition in an amount of from about 0.001 wt. % to about 5.0 wt. %, 0.01 wt. % to about 3.0 wt. %, preferably from about 0.3 wt. % to about 2.5 wt. %, and more preferably from about 0.35 wt. % to about 2.0 wt. %, by weight of the polyol premix composition. While these are usual amounts, the quantity amount of the foregoing catalyst can vary widely, and the appropriate amount can be easily be determined by those skilled in the art.

Furthermore, as mentioned above, applicants have found that it is desirable to use certain metal-based catalysts in foamable and foaming systems having relatively high levels of water, and particularly high-water poyol pre-mix compostions. More specifically, applicants have found that certain catalysts based on zinc, tin, bismuth and potassium are preferred in such systems because of their ability to retain their reactivity and avoid stability problems in such high water systems. Furthermore, applicants have found that catalysts based upon zinc and bismuth generally have a acceptable performance in systems having relatively low water content but that not all of such catalyst are able to produce the most desirably results in high-water content systems and compositions. Applicants have found that the class of metal catalysts described above, and preferably zinc-based catalysts and/or bismuth-based catalysts, and even more preferably in certain embodiments amine/zinc-based/bismuth based catalyst blends are capable of performing effectively in high-water content systems and compositions wherein the metal catalyst comprises a precipitation-resistant metal-based catalyst(s) as that term is defined herein. In other or additional embodiments, applicants have found that it is preferred in certain systems that the metal catalysts comprise at least a first catalysts based upon tin and/or zinc, and a second catalyst based upon potassium and/or bismuth, and preferably the first and second metal catalysts comprise and preferably consist essentially of precipitation-resistant metal-based catalyst(s).

In another embodiment of the invention, the non-amine catalyst is a quaternary ammonium carboxylate. Useful quaternary ammonium carboxylates include, but are not limited to: (2-hydroxypropyl)trimethylammonium 2-ethylhexanoate (TMR® sold by Air Products and Chemicals) and (2-hydroxypropyl)trimethylammonium formate (TMR-2® sold by Air Products and Chemicals). These quaternary ammonium carboxylate catalysts are usually present in the polyol premix composition in an amount of from about 0.25 wt. % to about 3.0 wt. %, preferably from about 0.3 wt. % to about 2.5 wt. %, and more preferably from about 0.35 wt. % to about 2.0 wt. %, by weight of the polyol premix composition. While these are usual amounts, the quantity amount of catalyst can vary widely, and the appropriate amount can be easily be determined by those skilled in the art.

In another embodiment, as mentioned above, the non-amine catalyst is used in combination with an amine catalyst. Such amine catalysts may include any compound containing an amino group and exhibiting the catalytic activity provided herein. Such compounds may be straight chain or cyclic non-aromatic or aromatic in nature. Useful, non-limiting, amines include primary amines, secondary amines or tertiary amines. Useful tertiary amine catalysts non-exclusively include N,N, N',N",N"'-pentamethyldiethyltriamine, N,N-dicyclohexylmethylamine; N,N-ethyldiisopropylamine; N,N-dimethylcyclohexylamine; N,N-dimethylisopropylamine; N-methyl-N-isopropylbenzylamine; N-methyl-N-cyclopentylbenzylamine; N-isopropyl-N-sec-butyl-trifluoroethylamine; N,N-diethyl-(α-phenylethyl)amine, N,N,N-tri-n-propylamine, or combinations thereof. Useful secondary amine catalysts non-exclusively include dicyclohexylamine; t-butylisopropylamine; di-t-butylamine; cyclohexyl-t-butylamine; di-sec-butylamine, dicyclopentylamine; di-(α-trifluoromethylethyl)amine; di-(α-phenylethyl)amine; or combinations thereof. Useful primary amine catalysts non-exclusively include: triphenylmethylamine and 1,1-diethyl-n-propylamine.

Other useful amines includes morpholines, imidazoles, ether containing compounds, and the like. These include: dimorpholinodiethylether N-ethylmorpholine
N-methylmorpholine
bis(dimethylaminoethyl)ether
imidizole
n-methylimidazole
1,2-dimethylimidazole
dimorpholinodimethylether
N,N,N',N',N",N"-pentamethyldiethylenetriamine
N,N,N',N',N",N"-pentaethyldiethylenetriamine
N,N,N',N',N",N"-pentamethyldipropylenetriamine
bis(diethylaminoethyl)ether
bis(dimethylaminopropyl)ether.

In embodiments where an amine catalyst is provided, the catalyst may be provided in any amount to achieve the function of the instant invention without affecting the foam forming or storage stability of the composition, as characterized herein. To this end, the amine catalyst may be provided in amounts less than or greater than the non-amine catalyst.

The preparation of polyurethane or polyisocyanurate foams using the compositions described herein may follow any of the methods well known in the art can be employed, see Saunders and Frisch, Volumes I and II Polyurethanes Chemistry and technology, 1962, John Wiley and Sons, New York, N.Y. or Gum, Reese, Ulrich, Reaction Polymers, 1992, Oxford University Press, New York, N.Y. or Klempner and Sendijarevic, Polymeric Foams and Foam Technology, 2004, Hanser Gardner Publications, Cincinnati, Ohio. In general, polyurethane or polyisocyanurate foams are prepared by combining an isocyanate, the polyol premix composition, and other materials such as optional flame retardants, colorants, or other additives. These foams can be rigid, flexible, or semi-rigid, and can have a closed cell structure, an open cell structure or a mixture of open and closed cells.

It is convenient in many applications to provide the components for polyurethane or polyisocyanurate foams in pre-blended formulations. Most typically, the foam formulation is pre-blended into two components. The isocyanate and optionally other isocyanate compatible raw materials, including but not limited to blowing agents and certain silicone surfactants, comprise the first component, commonly referred to as the "A" component. The polyol mixture composition, including surfactant, catalysts, blowing agents, and optional other ingredients comprise the second component, commonly referred to as the "B" component. In any given application, the "B" component may not contain all the above listed components, for example some formulations omit the flame retardant if flame retardancy is not a required foam property. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, water, and even other polyols can be added as a stream to the mix head or reaction site. Most conveniently, however, they are all incorporated into one B component as described above.

A foamable composition suitable for forming a polyurethane or polyisocyanurate foam may be formed by reacting an organic polyisocyanate and the polyol premix composition described above. Any organic polyisocyanate can be employed in polyurethane or polyisocyanurate foam synthesis inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry. These are described in, for example, U.S. Pat. Nos. 4,868,224; 3,401,190; 3,454,606; 3,277,138; 3,492,330; 3,001,973; 3,394,164; 3,124.605; and 3,201,372. Preferred as a class are the aromatic polyisocyanates.

Representative organic polyisocyanates correspond to the formula:

$$R(NCO)_z$$

wherein R is a polyvalent organic radical which is either aliphatic, aralkyl, aromatic or mixtures thereof, and z is an integer which corresponds to the valence of R and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'5,5'-tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; Typical aliphatic polyisocyanates are alkylene diisocyanates such as trimethylene diisocyanate, tetramethylene diisocyanate, and hexamethylene diisocyanate, isophorene diisocyanate, 4,4'-methylenebis(cyclohexyl isocyanate), and the like; typical aromatic polyisocyanates include m-, and p-phenylene disocyanate, polymethylene polyphenyl isocyanate, 2,4- and 2,6-toluenediisocyanate, dianisidine diisocyanate, bitoylene isocyanate, naphthylene 1,4-diisocyanate, bis(4-isocyanatophenyl)methene, bis(2-methyl-4-isocyanatophenyl)methane, and the like. Preferred polyisocyanates are the polymethylene polyphenyl isocyanates, Particularly the mixtures containing from about 30 to about 85 percent by weight of methylenebis(phenyl isocyanate) with the remainder of the mixture comprising the polymethylene polyphenyl polyisocyanates of functionality higher than 2. These polyisocyanates are prepared by conventional methods known in the art. In the present invention, the polyisocyanate and the polyol are employed in amounts which will yield an NCO/OH stoichiometric ratio in a range of from about 0.9 to about 5.0. In the present invention, the NCO/OH equivalent ratio is, preferably, about 1.0 or more and about 3.0 or less, with the ideal range being from about 1.1 to about 2.5. Especially suitable organic polyisocyanate include polymethylene polyphenyl isocyanate, methylenebis (phenyl isocyanate), toluene diisocyanates, or combinations thereof.

In the preparation of polyisocyanurate foams, trimerization catalysts are used for the purpose of converting the blends in conjunction with excess A component to polyisocyanurate-polyurethane foams. The trimerization catalysts employed can be any catalyst known to one skilled in the art, including, but not limited to, glycine salts, tertiary amine trimerization catalysts, quaternary ammonium carboxylates, and alkali metal carboxylic acid salts and mixtures of the various types of catalysts. Preferred species within the classes are potassium acetate, potassium octoate, and sodium N-(2-hydroxy-5-nonylphenol)methyl-N-methylglycinate.

Conventional flame retardants can also be incorporated, preferably in amount of not more than about 20 percent by weight of the reactants. Optional flame retardants include tris(2-chloroethyl)phosphate, tris(2-chloropropyl)phosphate, tris(2,3-dibromopropyl)phosphate, tris(1,3-dichloropropyl)phosphate, tri(2-chloroisopropyl)phosphate, tricresyl phosphate, tri(2,2-dichloroisopropyl)phosphate, diethyl N,N-bis(2-hydroxyethyl)aminomethylphosphonate, dimethyl methylphosphonate, tri(2,3-dibromopropyl)phosphate, tri(1,3-dichloropropyl)phosphate, and tetra-kis-(2-chloroethyl)ethylene diphosphate, triethylphosphate, diammonium phosphate, various halogenated aromatic compounds, antimony oxide, aluminum trihydrate, polyvinyl chloride, melamine, and the like. Other optional ingredients can include from 0 to about 7 percent water, which chemically reacts with the isocyanate to produce carbon dioxide. This carbon dioxide acts as an auxiliary blowing agent. Formic acid is also used to produce carbon dioxide by reacting with the isocyanate and is optionally added to the "B" component.

In addition to the previously described ingredients, other ingredients such as, dyes, fillers, pigments and the like can be included in the preparation of the foams. Dispersing agents and cell stabilizers can be incorporated into the present blends. Conventional fillers for use herein include, for example, aluminum silicate, calcium silicate, magnesium silicate, calcium carbonate, barium sulfate, calcium sulfate, glass fibers, carbon black and silica. The filler, if used, is normally present in an amount by weight ranging from about 5 parts to 100 parts per 100 parts of polyol. A pigment which can be used herein can be any conventional pigment such as titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines.

The polyurethane or polyisocyanurate foams produced can vary in density from about 0.5 pounds per cubic foot to about 60 pounds per cubic foot, preferably from about 1.0 to 20.0 pounds per cubic foot, and most preferably from about 1.5 to 6.0 pounds per cubic foot. The density obtained is a function of how much of the blowing agent or blowing agent mixture disclosed in this invention plus the amount of auxiliary blowing agent, such as water or other co-blowing agents is present in the A and/or B components, or alternatively added at the time the foam is prepared. These foams can be rigid, flexible, or semi-rigid foams, and can have a closed cell structure, an open cell structure or a mixture of open and closed cells. These foams are used in a variety of well known applications, including but not limited to thermal insulation, cushioning, flotation, packaging, adhesives, void filling, crafts and decorative, and shock absorption.

The following non-limiting examples serve to illustrate the invention.

Example 1A

Spray Foam

Two typical commercial polyol spray-foam formulations are formed in accordance with Table E1A below:

TABLE E1A

| Components | php | |
|---|---|---|
| Polyol Blend, 50° F. (10° C.) | | |
| Voranol ® 470X | 40.0 | 40.0 |
| Terate ® 4020 | 60.0 | 60.0 |
| Dabco ® DC193 | 2.0 | 2.0 |
| Dabco ® K-15 | 1.4 | 1.4 |

TABLE E1A-continued

| Components | php | |
|---|---|---|
| Polycat ® 5 | 1.4 | 1.4 |
| Dabco 33LV | 0.7 | 1.2 |
| Antiblaze AB80 | 20 | 1.5 |
| Water | 2 | 2.0 |
| 245fa | 20 | — |
| 1233zd(E) | — | 20 |
| Isocyanate, 70° F. (21° C.) | | |
| Lupranate ® M20S | Iso Index = 150 | |

Figure 3:
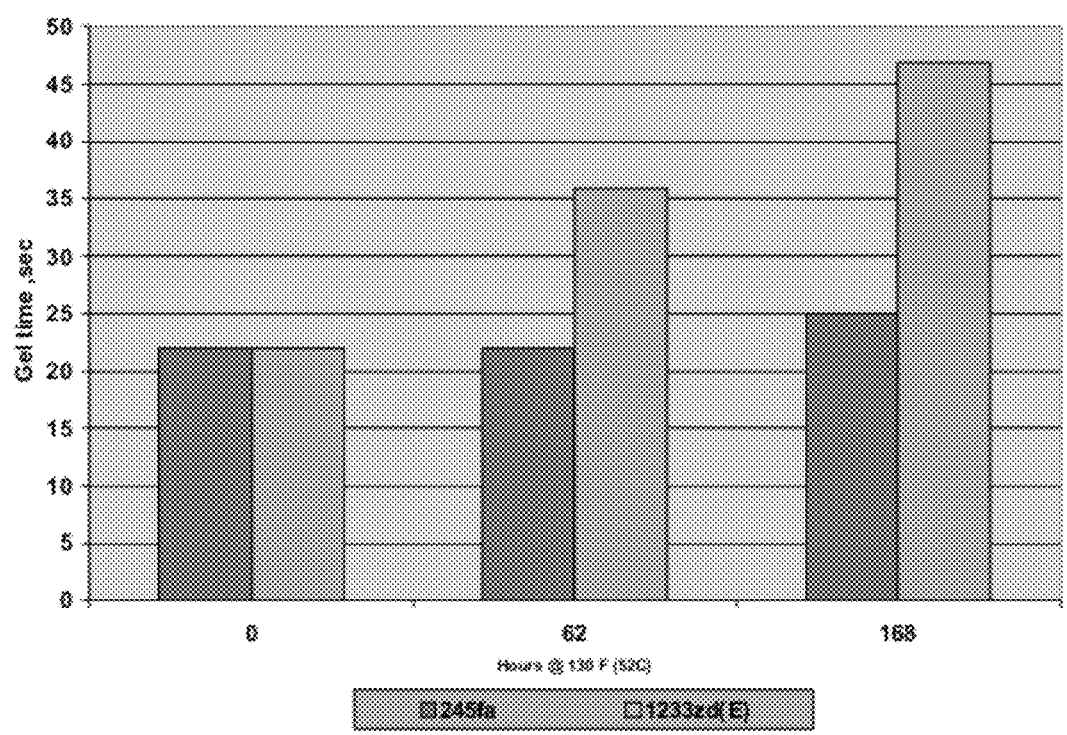
FIG. 3 is a graphical representation of the results according to the description in Example 1A

After testing for stability, the results reported in FIG. 3 are obtained.

The formulations are maintained for up to 168 hours at about 52 C according to the procedure described above. Three different foams are formed from each formulation: one essentially upon initial formulation; one after about 62 hours of aging; and one after 168 hours of aging. Gel time is observed for each of the foams thus formed and the results are provided in FIG. 3. As can be seen from the above example and the data illustrated in FIG. 3, the gel time for a typical foam formulation, particularly a spray foam formulation, increases substantially as the foamable composition is aged when a typical catalyst formulation is used, especially in comparison to the level of increase which is observed for saturated blowing agent materials such as HFC-245fa. Those skilled in the art would appreciate that such performance is generally considered not acceptable for many commercial embodiments.

Example 1B

Spray Foam

Two typical commercial polyol spray-foam formulations are formed in accordance with Table E1BA below:

TABLE E1BA

| Components | Sample LW php | Sample HW php |
|---|---|---|
| Polyol Blend, 50° F. (10° C.) | | |
| Mannich polyether polyol having an OH# 470 (Voranol 470X) | 40 | 40 |
| Aromatic polyester polyol (Terate 4020) | 60 | 60 |
| Silicone surfactant (Dabco DC193) | 2.0 | 2.0 |
| Potassium octoate in diethylene glycol solution - 15% (Dabco K-15 | 1.4 | 1.4 |
| Dicyclohexylmethylamine | 2.0 | 2.0 |
| zinc 2-ethlyhexanoate* | 2.0 | 2.0 |
| Bismuth Carboxylate Catalyst (Dabco MB-20) | 0.7 | 0.7 |
| TCPP (tris (2-chloroisopropyl) phosphate | 20 | 20 |
| Water | 0.5 | 2 |
| 1233zd(E) | 20 | 20 |
| Isocyanate, 70° F. (21° C.) | | |
| Polymethyldiisocyanate (PMDI) | ISO Index = 150 | ISO Index = 150 |
| Test results for precipitation resistance (according to test described herein) | Negative (no substantial precipitation observed based on High Temperature Test and Low Temperature Test) | Positive (substantial precipitation observed after Both High Temperture and Low Temperature Tests) |

*The MSDS for this material is attached as Attachment C and incorporated herein by reference.

The table above indicates that while the zinc-based catalyst and the bismuth-based catalyst used in this system does not produce a precipitate in low water systems (Sample LW), when tested under either High Temperature test or the Low Temperature test, but that a precipitate is formed in both tests when the composition is otherwise identical except that the system is a high water content system (Sample HW).

For comparison purposes, the zinc catalyst used in Sample HW above is replaced with a catalyst that is a zinc-based precipitation resistant catalyst according to the present invention, as illustrated by Sample HW-PR in Table E1BB below:

TABLE E1BB

| Components | SAMPLE HW-PR php |
|---|---|
| Polyol Blend, 50° F. (10° C.) | |
| Mannich polyether polyol having an OH# of 470 | 40.0 |
| Aromatic polyester polyol | 60.0 |
| Silicone surfactant | 2.0 |
| Potassium octoate solution - 15% | 1.4 |
| Dicyclohexylmethylamine | 2.0 |
| K-Kat XK-614 | 2.0 |
| MB-20 Bismuth Catalyst | 0.7 |
| TCPP | 20 |
| Water | 2 |
| 1233zd(E) | 20 |
| Isocyanate, 70° F. (21° C.) | |
| Lupranate ® M20S | Iso Index = 150 |
| Test results for precipitation resistance (according to test described herein) | Negative/Postitive (no substantial precipitation observed after the High Temperature test but bismuth salt precipitation is observed after three months of the Low Temperature test) |

In the above formulation, the K-Kat XK-614 is blended with the polyol blend (resins) first and the water component is then added, and applicants have found that this the preferred order of addition of the components in the system.

After testing for stability using the same procedure as described in Example 1 above, the stability is greatly improved for the Sample HW in Table E1BB, showing no increase in gel time even when the formulation is stored before use for 168 hours at 52 C.

Example 2

Spray Foam without Catalyst

A typical commercial polyol spray-foam formulations, except with no catalyst present, is formed in accordance with Table E2A below:

TABLE E2A

| Components | php |
|---|---|
| Polyol Blend, 50° F. (10° C.) | |
| Voranol ® 470X | 40 |
| Terate 4020 ® | 60 |
| Dabco ® DC193 | 2 |
| Water | 2 |
| Antiblaze ® AB80 | 20 |
| 1233zd(E) | 20 |
| Isocyanate, 70° F. (21° C.) | |
| Lupranate ® M20S | ISO Index = 150 |

After testing for stability, results consistent with those illustrated in FIG. 1 are obtained, indicating that 1233zd(E) is acceptable as a blowing agent for use in combination with typical commercially used polyol compounds, including particularly polyal compounds used in typical commercial spray foam applications.

Example 3

Spray Foam with Catalyst

A polyol spray-foam formulations according to the present invention is formed using the preferred blowing agent 1233zd (E) but with a less-preferred catalyst system consisting of a single bismuth metal catalyst and a non-preferred amine-based catalyst in accordance with Table E3A below:

TABLE E3A

| Components | php |
|---|---|
| Polyol Blend, 50° F. (10° C.) | |
| Voranol ® 470X | 40.0 |
| Terate ® 4020 | 60.0 |
| Dabco ® DC193 | 2.0 |
| Dabco ® K-15 | 1.4 |
| Polycat 5 | 1.4 |
| MB-20 Bismuth Catalyst | 0.7 |
| Antiblaze AB80 | 20 |
| Water | 2 |
| 1233zd(E) | 20 |
| Isocyanate, 70° F. (21° C.) | |
| Lupranate ® M20S | Iso Index = 150 |

The same formulation as illustrated in Table E3A is formed, except the catalyst is replaced with a more preferred catalyst system of the present invention consisting of a first metal (zinc), precipitation resistant catalyst and second metal (bismuth) catalyst and a preferred amine-based catalyst in accordance with Table E3B below:

TABLE E3B

| Components | php |
|---|---|
| Polyol Blend, 50° F. (10° C.) | |
| Voranol ® 470X | 40.0 |
| Terate ® 4020 | 50.0 |
| Dabco ® DC193 | 2.0 |
| Dabco ® K-15 | 1.4 |
| Polycat ® 12 | 2.0 |
| Zinc Catalyst | 2.0 |

TABLE E3B-continued

| Components | php |
|---|---|
| Bismuth Catalyst | 0.7 |
| Antiblaze AB80 | 20 |
| Water | 2 |
| 1233zd(E) | 20 |
| Isocyanate, 70° F. (21° C.) | |
| Lupranate ® M20S | Iso Index = 150 |

*The Zinc Catalyst is K-Kat XK-614 described herein and the Bismuth catalyst is MB-20 described herein.

Figure 4:
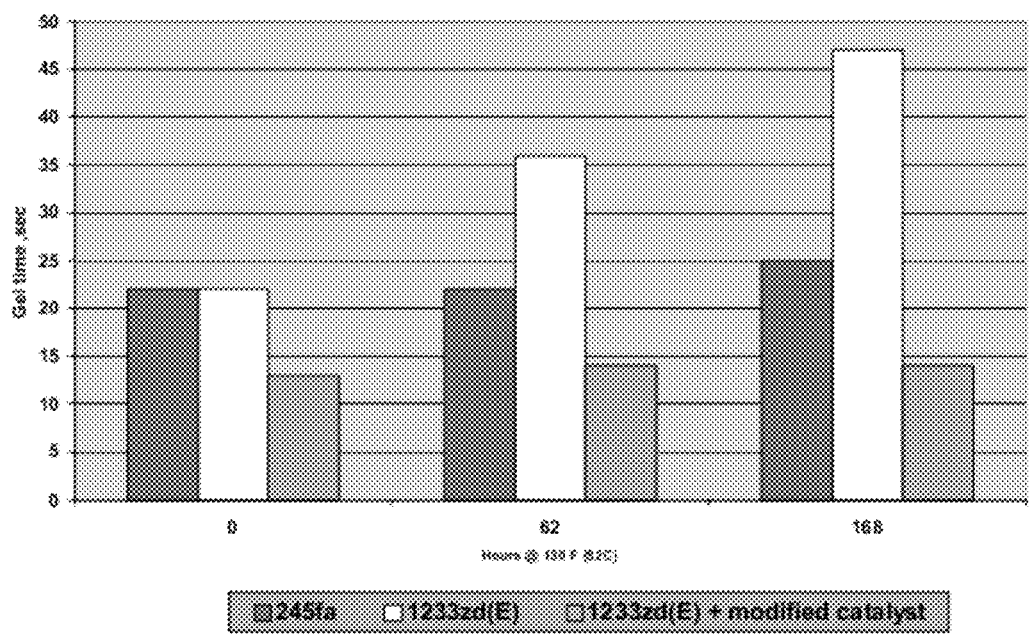
FIG. 4 is a graphical representation of the results according to the description in Example 3B.

After testing for stability, the results reported in FIG. 4 are obtained, with the data represented by the white column and labeled "1233zd(E)" corresponding to the results from formulation in Table E3A and the data represented by the green column and labeled "1233zd(E)+modified catalyst" corresponding to the results from formulation in Table E3B, illustrating no increase in gel time after 62 hours and only an 8% increase in gel time after 168 hours.

The formulation shows a negative result for precipitation resistance under High Temperature conditions (no substantial precipitation observed after the High Temperature test) but a positive result with respect to bismuth (bismuth salt precipitation is observed after three months of the Low Temperature test).

The results reported in this example illustrates the surprising and highly beneficial advantages associated with use of blowing agents, foamable compositions, foams and foaming methods using the preferred catalyst systems of the present invention.

Example 3C

Spray Foam with Catalyst

A polyol spray-foam formulation the same as the formulation used in Example 3A is formed, except that the bismuth catalyst that is not Precipitation Resistant according to the Low Temperature test is replaced by a bismuth catalyst that is Precipitation Resistant according to both the Low Temperature test and the High Temperature test.

TABLE E3C

| Components | php |
|---|---|
| Polyol Blend, 50° F. (10° C.) | |
| Voranol ® 470X | 40.0 |
| Terate ® 4020 | 50.0 |
| Dabco ® DC193 | 2.0 |
| Dabco ® K-15 | 1.4 |
| Polycat ® 12 | 2.0 |
| Zinc Catalyst | 2.0 |
| Bismuth Catalyst | 0.7 |
| Antiblaze AB80 | 20 |
| Water | 2 |
| 1233zd(E) | 20 |
| Isocyanate, 70° F. (21° C.) | |
| Lupranate ® M20S | Iso Index = 150 |

*The Zinc Catalyst is K-Kat XK-614 described herein and the Bismuth Catalyst is K-Kat XC-227 described herein.

The gel time for this typical foam formulation, particularly a spray foam formulation, did not increase after three months storage at room temperature when the blowing agent consists of 1233zd and the preferred catalyst of the present invention is used as per Table 3C. Those skilled in the art will appreciate that such performance is generally considered acceptable for many commercial embodiments and would appreciate that such an improvement in gel time performance is substantial, significant and surprising. Furthermore, the formulation shows a negative result for precipitation resistance under High Temperature conditions (no substantial precipitation observed after the High Temperature test) and a negative result with respect to bismuth (bismuth salt precipitation is not observed after three months of the Low Temperature test). Accordingly, both metal catalysts in this system are Precipitation Resistant under both the High Temperature and the Low Temperature tests.

Example 3D

Spray Foam with Catalyst

A polyol spray-foam formulation different than the formulation used in Example 3C is formed using the preferred blowing agent 1233zd(E) and the preferred catalyst system of Example 3C, as indicated in Table E3D below.

TABLE E3D

| Components | Php |
|---|---|
| Polyol Blend, 40° F. (4.4° C.) | |
| Polyether polyol EDA-PO, EDA-PO/EO (50/50) | 70 |
| Mannich polyol (OH 350) | 30.0 |
| Dabco ® 1 DC193 (Silicone surfactant) | 1.5 |
| Lead (20%) (optional) | 0.5 |
| Dabco K-15 | 1.5 |
| Polycat 12 | 2.0 |
| K-Kat ® 11 XK-614 Zinc Catalyst | 2.0 |
| K-Kat XK-227 Bismuth Catalyst | 0.7 |
| Antiblaze ® 13 AB80 | 20 |
| Water | 1.5 |
| 1233zd(E) | 30 |
| Isocyanate, 70° F. (21° C.) | |
| Lupranate ® 3 M20S | Iso Index = 150 |

As can be seen from the table above, the type and amounts of the various components are changed, but a catalyst consisting of a first metal (zinc) Precipitation Resistant catalyst and second metal (bismuth) Precipitation Resistant catalyst, and a preferred amine-based catalyst is used. Furthermore, the formulation shows Precipitation Resistance under High Temperature conditions (no substantial precipitation observed after the High Temperature test) and Precipitation Resistance under Low Temperature conditions (bismuth salt precipitation is not observed after three months of the Low Temperature test). Accordingly, both metal catalysts in this system are Precipitation Resistant under both the High Temperature and the Low Temperature tests.

Example 3E

Spray Foam with Catalyst

A polyol spray-foam formulation different than the formulation used in Example 3C is formed using the preferred blowing agent 1233zd(E) and a preferred catalyst system as indicated in Table E3E below.

TABLE E3E

| Components | Php |
|---|---|
| Polyol Blend, 40° F. (4.4° C.) | |
| Polyether polyol EDA-PO, EDA-PO/EO (50/50) | 70 |
| Mannich polyol (OH 350) | 30.0 |
| Dabco ® 1 DC193 (Silicone surfactant) | 1.5 |
| Lead (20%) (optional) | 0.5 |
| Dabco K-15 | 1.5 |
| Polycat 12 | 2.0 |
| potassium acetate | 2.7 |
| Antiblaze ® 13 AB80 | 20 |
| Water | 1.5 |
| 1233zd(E) | 30 |
| Isocyanate, 70° F. (21° C.) | |
| Lupranate ® 3 M20S | Iso Index = 150 |

The formulation shows a negative result for precipitation resistance under High Temperature conditions (no substantial precipitation observed after the High Temperature test) and precipitation resistance under Low Temperature conditions (no substantial precipitation is observed after three months of the Low Temperature test). Accordingly the metal catalysts in this system is Precipitation Resistant under both the High Temperature and the Low Temperature tests.

Example 3F

Spray Foam with Catalyst

A polyol spray-foam formulation different than the formulation used in Example 3C is formed using the preferred blowing agent 1233zd(E) and a preferred catalyst system as indicated in Table E3F below.

TABLE E3F

| Components | Php |
|---|---|
| Polyol Blend, 40° F. (4.4° C.) | |
| Polyether polyol EDA-PO, EDA-PO/EO (50/50) | 70 |
| Mannich polyol (OH 350) | 30.0 |
| Dabco ® 1 DC193 (Silicone surfactant) | 1.5 |
| Lead (20%) (optional) | 0.5 |
| Dabco K-15 | 1.5 |
| Polycat 12 | 2.0 |
| potassium octoate | 2.7 |
| Antiblaze ® 13 AB80 | 20 |
| Water | 1.5 |
| 1233zd(E) | 30 |
| Isocyanate, 70° F. (21° C.) | |
| Lupranate ® 3 M20S | Iso Index = 150 |

The formulation shows a negative result for precipitation resistance under High Temperature conditions (no substantial precipitation observed after the High Temperature test) and precipitation resistance under Low Temperature conditions (no substantial precipitation is observed after three months of the Low Temperature test). Accordingly the metal catalysts in this system is Precipitation Resistant under both the High Temperature and the Low Temperature tests.

Example 3G

Spray Foam with Catalyst

A polyol spray-foam formulation different than the formulation used in Example 3C is formed using the preferred blowing agent 1233zd(E) and a preferred catalyst system as indicated in Table E3G below.

TABLE E3G

| Components | Php |
|---|---|
| Polyol Blend, 40° F. (4.4° C.) | |
| Polyether polyol EDA-PO, EDA-PO/EO (50/50) | 70 |
| Mannich polyol (OH 350) | 30.0 |
| Dabco ® 1 DC193 (Silicone surfactant) | 1.5 |
| Lead (20%) (optional) | 0.5 |
| Dabco K-15 | 1.5 |
| Polycat 12 | 2.0 |
| sodium N-(2-hydroxy-5-nonylphenol)methyl-N-methylglycinate | 2.7 |
| Antiblaze ® 13 AB80 | 20 |
| Water | 1.5 |
| 1233zd(E) | 30 |
| Isocyanate, 70° F. (21° C.) | |
| Lupranate ® 3 M20S | Iso Index = 150 |

The formulation shows a negative result for precipitation resistance under High Temperature conditions (no substantial precipitation observed after the High Temperature test) and precipitation resistance under Low Temperature conditions (no substantial precipitation is observed after three months of the Low Temperature test). Accordingly the metal catalysts in this system is Precipitation Resistant under both the High Temperature and the Low Temperature tests.

Example 4

Comparative Example

A polyol (B Component) formulation was made up of 100 parts by weight of a polyol blend, 1.5 parts by weight Niax L6900 silicone surfactant, 1.5 parts by weight water, 1.2 parts by weight pentamethyldiethylenetriamine (sold as Polycat 5 by Air Products and Chemicals) catalyst, and 8 parts by weight trans-1,3,3,3-tetrafluoropropene blowing agent. The total B component composition, when freshly prepared and combined with 120.0 parts by weight of Lupranate M20S polymeric isocyanate yielded a good quality foam with a fine and regular cell structure. Foam reactivity was typical for a pour in place foam. The total B-side composition (112.2 parts) was then aged at 130° F. for 62 hours, and then combined with 120.0 parts of M20S polymeric isocyanate to make a foam. The foam was very poor in appearance with significant cell collapse. Significant yellowing of the polyol premix was noted during aging.

Example 5

Comparative Example

A polyol (B Component) formulation was made up of 100 parts by weight of a polyol blend, 1.5 parts by weight Niax L6900 silicone surfactant, 1.5 parts by weight water, 1.2 parts by weight pentamethyldiethylenetriamine (sold as Polycat 5 by Air Products and Chemicals) catalyst and 8 parts by weight blowing agent trans-1-chloro-3,3,3-trifluoropropene. The total B component composition, when freshly prepared and combined with 120.0 parts by weight of Lupranate M20S polymeric isocyanate yielded a good quality foam with a fine and regular cell structure. Foam reactivity was typical for a pour in place foam. The total B-side composition (112.2 parts) was then aged at 130° F. for 168 hours, and then combined with 120.0 parts of M20S polymeric isocyanate to make a foam. The foam was very poor in appearance with significant cell collapse. Significant yellowing of the polyol premix was noted during aging.

Example 6

Foam Test

A polyol (B Component) formulation was made up of 100 parts by weight of a polyol blend, 1.5 parts by weight Niax L6900 silicone surfactant, 1.5 parts by weight water, 2.0 parts by weight N,N-dicyclohexylmethylamine (sold as Polycat 12 by Air Products and Chemicals) catalyst (a different amine was used such that both this foam and the comparative example had the same initial reactivity), 1.75 parts by weight a bismuth based catalyst (sold as Dabco MB-20 by Air Products and Chemicals) and 8 parts by weight trans-1,3,3,3-tetrafluoropropene blowing agent. The total B component composition, when freshly prepared and combined with 120.0 parts by weight of Lupranate M20S polymeric isocyanate yielded a good quality foam with a fine and regular cell structure. Foam reactivity was typical for a pour in place foam. The total B-side composition (114.75 parts) was then aged at 130° F. for 336 hours, and then combined with 120.0 parts of M20S polymeric isocyanate to make a foam. The foam was excellent in appearance with no evidence of cell collapse. There was no yellowing of the polyol premix noted during aging.

Example 7

Foam Test

A polyol (B Component) formulation was made up of 100 parts by weight of a polyol blend, 1.5 parts by weight Niax L6900 silicone surfactant, 0.5 parts by weight water, 2.0 parts by weight N,N-dicyclohexylmethylamine (sold as Polycat 12 by Air Products and Chemicals) catalyst (a different amine was used such that both this foam and the comparative example had the same initial reactivity), 1.75 parts by weight of zinc 2-ethylhexanoate (sold as 30-3038 by Strem Chemicals) and 8 parts by weight trans-1-chloro-3,3,3-trifluoropropene blowing agent. The total B component composition, when freshly prepared and combined with 103.0 parts by weight of Lupranate M20S polymeric isocyanate yielded a good quality foam with a fine and regular cell structure. Foam reactivity was typical for a pour in place foam. The total B-side composition (113.75 parts) was then aged at 130° F. for 336 hours, and then combined with 103.0 parts of M20S polymeric isocyanate to make a foam. The foam was excellent in appearance with no evidence of cell collapse. There was no yellowing of the polyol premix noted during aging Example 8

Foam Test

A polyol (B Component) formulation was made up of 100 parts by weight of a polyol blend, 1.5 parts by weight Niax L6900 silicone surfactant, 1.0 parts by weight water, 2.0 parts by weight N,N-dicyclohexylmethylamine (sold as Polycat 12 by Air Products and Chemicals) catalyst (a different amine was used such that both this foam and the comparative example had the same initial reactivity), 1.75 parts by weight a Potassium based catalyst (sold as Dabco K15 by Air Products and Chemicals) and 8 parts by weight trans-1-chloro-3,3,3-trifluoropropene blowing agent. The total B component composition, when freshly prepared and combined with 112.0 parts by weight of Lupranate M20S polymeric isocyanate yielded a good quality foam with a fine and regular cell structure. Foam reactivity was typical for a pour in place foam. The total B-side composition (114.75 parts) was then aged at 130° F. for 504 hours, and then combined with 112.0 parts of M20S polymeric isocyanate to make a foam. The foam was good in appearance with only slight evidence of cell collapse. There was very slight yellowing of the polyol premix noted during aging.

Example 9

Panel Foam

Two typical commercial polyol panel-foam formulations are formed in accordance with Table E9A below:

TABLE E9A

| Components | SAMPLE 9-LW php | SAMPLE 9-HW php |
|---|---|---|
| Polyol Blend, 50° F. (10° C.) | | |
| Sucrose/glycerine initiated polyether polyol having OH # 490 (Veranol 490) | 50 | 50 |
| Glycerine initiated triol polyether polyol having OH# 290 (Veranol 270) | 50 | 50 |
| Dicyclohexylmethylamine (Polycat 12) | 2.00 | 2.00 |
| zinc 2-ethlyhexanoate manufactured by Strem Chemicals, product number 30-3038 (attachment C) | 1.75 | 1.75 |
| Non-hydrolizable silicone copolymer (Niax L6900) | 1.5 | 1.5 |
| Water | 0.5 | 1.5 |
| 1233zd(E) | 8 | 8 |
| Isocyanate, 70° F. (21° C.) | | |
| Lupranate ® M20S | ISO Index = 110 | ISO Index = 110 |
| Test results for precipitation resistance | Negative (no substantial precipitation observed) | Positive (substantial precipitation observed) |

The table above indicates that while the zinc-based catalyst does not produce a precipitate in low water systems (Sample LW), that a precipitate is formed when the composition is otherwise identical except that the system is a high water content system (Sample HW). The zinc catalyst used in Sample HW above is replaced with a catalyst that is a precipitation resistant catalyst according to the present invention as illustrated by Sample HW-PR in Table E9B below:

TABLE E9B

| Components | SAMPLE HW-PR php |
|---|---|
| Polyol Blend, 50° F. (10° C.) | |
| Voranol ® 490 (Sucrose/glycerine initiated polyether polyol) | 50 |
| Voranol ® 270 (Glycerine initiated triol polyether polyol) | 50 |
| Dicyclohexylmethylamine (Polycat ® 12) | 2.00 |
| K-Kat XK-614 | 1.75 |
| Niax ® L6900 (Non-hydrolizable silicone copolymer) | 1.5 |
| Water | 1.5 |
| 1233zd(E) | 8 |
| Isocyanate, 70° F. (21° C.) | |
| Lupranate ® M20S | ISO Index = 110 |
| Test results for precipitation resistance (according to test described herein) | Negative (no substantial precipitation observed) |

In the above formulation, the K-Kat XK-614 is blended with the polyol blend (resins) first and the water component is then added, and applicants have found that this the preferred order of addition of the components in the system.

After testing for stability, the Sample HW had performance in terms of gel time that is substantially inferior to the performance of the Sample HW-PR as measured by gel time.

What is claimed is:

1. A foamable composition comprising:
   a. a hydrohaloolefin blowing agent comprising 1,3,3,3-tetrafluoropropene and/or 1-chloro-3,3,3-trifluoropropene,
   b. one or more polyols,
   c. one or more surfactants, and
   d. a catalyst system comprising at least a first precipitant resistant metal catalyst and at least a second precipitant resistant metal catalyst, wherein the first and second metal catalysts are not the same and at least one amine catalyst selected from the group of amine catalysts having a pKa of not less than about 10.

2. The foamable composition of claim 1 wherein said first and second metal catalyst is selected from the group consisting of bismuth nitrate, lead 2-ethylhexoate, lead benzoate, lead naphthanate, ferric chloride, antimony trichloride, antimony glycolate, tin salts of carboxylic acids, dialkyl tin salts of carboxylic acids, potassium acetate, potassium octoate, potassium 2-ethylhexoate, potassium salts of carboxylic acids, zinc salts of carboxylic acids, zinc 2-ethylhexanoate, glycine salts, alkali metal carboxylic acid salts, and sodium N-(2-hydroxy-5-nonylphenol)methyl-N-methylglycinate, tin (II) 2-ethylhexanoate, dibutyltin dilaurate, and combinations thereof.

3. The foamable composition of claim 2 wherein said first and second metal catalyst is each present in an amount of about 0.001 wt. % to about 5.0 wt. %, by weight of the composition.

4. The foamable composition of claim 1 further comprising a quaternary ammonium carboxylate.

5. The foamable composition of claim 4 wherein said quaternary ammonium carboxylate is (2-hydroxypropyl)trimethylammonium 2-ethylhexanoate or (2-hydroxypropyl)trimethylammonium formate.

6. The foamable composition of claim 5 wherein said quaternary ammonium carboxylate is present in an amount of about 0.25 wt. % to about 3.0 wt. %, by weight of the composition.

7. The foamable composition of claim 1 wherein said blowing agent further comprises a co-blowing agent selected from the group consisting of water, hydrocarbon, fluorocarbon, chlorocarbon, hydrochlorofluorocarbon, hydrofluorocarbon, halogenated hydrocarbon, ether, ester, alcohol, aldehyde, ketone, organic acid, gas generating material, and combinations thereof.

8. The foamable composition of claim 1 wherein said blowing agent comprises trans-1,3,3,3-tetrafluoropropene and/or trans-1-chloro-3,3,3-trifluoropropene.

9. The foamable composition of claim 1 wherein said blowing agent comprises in substantial proportion trans-1-chloro-3,3,3-trifluoropropene 1233zd(E).

10. The foamable composition of claim 1 wherein said amine catalyst comprises n-metheyldicyclohexyl-amine.

11. The foamable composition of claim 1 wherein the amine catalyst comprises methyl(n-methylamino b-sodium acetate nonylphenol) 2-.

12. A polyol premix composition comprising:
   a. a hydrohaloolefin blowing agent comprising 1,3,3,3-tetrafluoropropene and/or 1-chloro-3,3,3-trifluoropropene,
   b. one or more polyols,
   c. one or more surfactants,
   d. a non-amine catalyst comprising a first precipitant resistant metal catalyst and a second precipitant resistant metal catalyst, wherein the metal of said first metal catalyst is not the same as the metal of said second catalyst, each of said first and second metal catalysts comprise an organic salt wherein the metal is selected from the group consisting of bismuth, lead, tin, zinc, chromium, cobalt, copper, iron, manganese, magnesium, potassium, sodium, titanium, mercury, zinc, antimony, uranium, cadmium, thorium, aluminum, nickel, cerium, molybdenum, vanadium, zirconium, and combinations thereof, and
   e. at least one amine catalyst selected from the group of amine catalysts having a pKa of not less than about 10.

13. The polyol premix composition of claim 12 wherein each of said first and second metal catalysts comprise a compound selected from the group consisting of bismuth nitrate, lead 2-ethylhexoate, lead benzoate, lead naphthanate, ferric chloride, antimony trichloride, antimony glycolate, tin salts of carboxylic acids, dialkyl tin salts of carboxylic acids, potassium acetate, potassium octoate, potassium 2-ethylhexoate, potassium salts of carboxylic acids, zinc salts of carboxylic acids, zinc 2-ethylhexanoate, glycine salts, alkali metal carboxylic acid salts, sodium N-(2-hydroxy-5-nonylphenol)methyl-N-methylglycinate, tin (II) 2-ethylhexanoate, dibutyltin dilaurate, and combinations thereof.

14. The polyol premix composition of claim 12 wherein said blowing agent comprises trans-1,3,3,3-tetrafluoropropene and/or trans-1-chloro-3,3,3-trifluoropropene.

15. A foamable composition comprising:
   a. a hydrohaloolefin blowing agent comprising 1,3,3,3-tetrafluoropropene and/or 1-chloro-3,3,3-trifluoropropene,
   b. one or more polyols,
   c. one or more surfactants, and
   d. a catalyst system comprising a precipitant resistant bismuth metal catalyst, a precipitant resistant zinc metal catalyst, and at least one amine catalyst having a pKa of not less than about 10.

16. The foamable composition of claim 15, wherein the precipitant resistant bismuth metal catalyst comprises an organobismuth-based catalyst.

17. The foamable composition of claim 15, wherein the precipitant resistant bismuth metal catalyst comprises a bismuth carboxylate.

18. The foamable composition of claim 15, wherein the precipitant resistant zinc metal catalyst comprises an organozinc-based catalyst.

19. The foamable composition of claim 15, wherein the precipitant resistant zinc metal catalyst comprises a zinc carboxylate.

20. The foamable composition of claim 19, wherein the precipitant resistant zinc metal catalyst comprises zinc 2-ethylhexanoate.

21. The foamable composition of claim 15 wherein each of said bismuth and zinc metal catalyst is each present in an amount of about 0.001 wt. % to about 5.0 wt. %, by weight of the composition.

22. The foamable composition of claim 15 further comprising a quaternary ammonium carboxylate.

23. The foamable composition of claim 22 wherein said quaternary ammonium carboxylate is (2-hydroxypropyl)trimethylammonium 2-ethylhexanoate or (2-hydroxypropyl) trimethylammonium formate.

24. The foamable composition of claim 22 wherein said quaternary ammonium carboxylate is present in an amount of about 0.25 wt. % to about 3.0 wt. %, by weight of the composition.

25. The foamable composition of claim 15 wherein said blowing agent further comprises a co-blowing agent selected from the group consisting of water, hydrocarbon, fluorocarbon, chlorocarbon, hydrochlorofluorocarbon, hydrofluorocarbon, halogenated hydrocarbon, ether, ester, alcohol, aldehyde, ketone, organic acid, gas generating material, and combinations thereof.

26. The foamable composition of claim 15 wherein said blowing agent comprises trans-1,3,3,3-tetrafluoropropene and/or trans-1-chloro-3,3,3-trifluoropropene.

27. The foamable composition of claim 15 wherein said blowing agent comprises in substantial proportion trans-1-chloro-3,3,3-trifluoropropene.

28. The foamable composition of claim 15 wherein said blowing agent comprises in substantial proportion trans-1,3,3,3-tetrafluoropropene.

* * * * *